(12) United States Patent
Malhotra et al.

(10) Patent No.: US 9,857,238 B2
(45) Date of Patent: Jan. 2, 2018

(54) THERMODYNAMIC MODEL GENERATION AND IMPLEMENTATION USING OBSERVED HVAC AND/OR ENCLOSURE CHARACTERISTICS

(71) Applicant: Google Inc., Mountain View, CA (US)

(72) Inventors: Kara Malhotra, San Mateo, CA (US); Yoky Matsuoka, Palo Alto, CA (US); Mark Malhotra, San Mateo, CA (US); Allen Minich, San Mateo, CA (US); Joseph Ruff, San Jose, CA (US)

(73) Assignee: Google Inc., Mountain View, CA (US)

( * ) Notice: Subject to any disclaimer, the term of this patent is extended or adjusted under 35 U.S.C. 154(b) by 792 days.

(21) Appl. No.: 14/256,741

(22) Filed: Apr. 18, 2014

(65) Prior Publication Data

US 2015/0300892 A1 Oct. 22, 2015

(51) Int. Cl.
*G06F 9/46* (2006.01)
*G01K 13/00* (2006.01)
(Continued)

(52) U.S. Cl.
CPC ............ *G01K 13/00* (2013.01); *F24F 11/006* (2013.01); *G05D 23/1917* (2013.01);
(Continued)

(58) Field of Classification Search
None
See application file for complete search history.

(56) References Cited

U.S. PATENT DOCUMENTS 3,991,357 A 11/1976 Kaminski
4,183,290 A 1/1980 Kucharczyk
(Continued)

FOREIGN PATENT DOCUMENTS

CA 2202008 2/2000
EP 196069 12/1991
(Continued)

OTHER PUBLICATIONS

Aprilaire Electronic Thermostats Model 8355 User's ManualResearch Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
(Continued)

*Primary Examiner* — Diem Cao
(74) *Attorney, Agent, or Firm* — Kilpatrick Townsend & Stockton LLP

(57) ABSTRACT

Techniques for determining and using a thermodynamic model that characterizes a thermodynamic response of an enclosure conditioned by an HVAC system are disclosed. To determine a thermodynamic model, temperature information when the HVAC system operates in a first state may first be received. A response interval may then be determined where the response interval indicates an estimated time between when the HVAC system begins operating in the first state and when the temperature within the enclosure begins to change in a direction associated with the first state. Weighting factors corresponding to basis functions may then be determined, where the weighted basis functions characterize the temperature trajectory of the enclosure in response to the HVAC system operating in the first state. The basis functions may include a first basis function that is evaluated from a time that the HVAC system begins operating in the first state until a time when the response interval ends, and a second basis function that is evaluated beginning at the time when the response interval ends.

17 Claims, 15 Drawing Sheets

(51) Int. Cl.
*F24F 11/00* (2006.01)
*G05D 23/19* (2006.01)
*H04L 12/28* (2006.01)

(52) U.S. Cl.
CPC ... *H04L 12/2807* (2013.01); *F24F 2011/0063* (2013.01); *F24F 2011/0071* (2013.01); *G01K 2201/00* (2013.01)

(56) References Cited

U.S. PATENT DOCUMENTS

| | | |
|---|---|---|
| 4,223,831 A | 9/1980 | Szarka |
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,897,798 A | 1/1990 | Cler |
| 4,971,136 A | 11/1990 | Mathur et al. |
| 5,088,645 A | 2/1992 | Bell |
| 5,211,332 A | 5/1993 | Adams |
| 5,240,178 A | 8/1993 | Dewolf et al. |
| 5,244,146 A | 9/1993 | Jefferson et al. |
| 5,395,042 A | 3/1995 | Riley et al. |
| 5,476,221 A | 12/1995 | Seymour |
| 5,499,196 A | 3/1996 | Pacheco |
| 5,555,927 A | 9/1996 | Shah |
| 5,611,484 A | 3/1997 | Uhrich |
| 5,808,294 A | 9/1998 | Neumann |
| 5,902,183 A | 5/1999 | D'Souza |
| 5,909,378 A | 6/1999 | De Milleville |
| 5,918,474 A | 7/1999 | Khanpara et al. |
| 5,977,964 A | 11/1999 | Williams et al. |
| 6,062,482 A | 5/2000 | Gauthier et al. |
| 6,066,843 A | 5/2000 | Scheremeta |
| 6,072,784 A | 6/2000 | Agrawal et al. |
| 6,095,427 A | 8/2000 | Hoium et al. |
| 6,098,893 A | 8/2000 | Berglund et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,478,233 B1 | 11/2002 | Shah |
| 6,645,066 B2 | 11/2003 | Gutta et al. |
| 6,769,482 B2 | 8/2004 | Wagner et al. |
| 6,990,821 B2 | 1/2006 | Singh et al. |
| 7,024,336 B2 | 4/2006 | Salsbury et al. |
| 7,149,727 B1 | 12/2006 | Nicholls et al. |
| 7,149,729 B2 | 12/2006 | Kaasten et al. |
| 7,188,482 B2 | 3/2007 | Sadegh et al. |
| 7,379,791 B2 | 5/2008 | Tamarkin et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,219,249 B2 | 7/2012 | Harrod et al. |
| 2004/0249479 A1 | 12/2004 | Shorrock |
| 2005/0090915 A1 | 4/2005 | Geiwitz |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0280421 A1 | 12/2005 | Yomoda et al. |
| 2006/0186214 A1 | 8/2006 | Simon et al. |
| 2006/0196953 A1 | 9/2006 | Simon et al. |
| 2007/0045431 A1 | 3/2007 | Chapman, Jr. et al. |
| 2007/0115902 A1 | 5/2007 | Shamoon et al. |
| 2007/0205297 A1 | 9/2007 | Finkam et al. |
| 2008/0015742 A1 | 1/2008 | Kulyk et al. |
| 2008/0183335 A1 | 7/2008 | Poth et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0171862 A1 | 7/2009 | Harrod et al. |
| 2009/0254225 A1 | 10/2009 | Boucher et al. |
| 2009/0259713 A1 | 10/2009 | Blumrich et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0167783 A1 | 7/2010 | Alameh et al. |
| 2010/0179704 A1 | 7/2010 | Ozog |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077758 A1 | 3/2011 | Tran et al. |
| 2011/0077896 A1 | 3/2011 | Steinberg et al. |
| 2011/0151837 A1 | 6/2011 | Winbush, III |
| 2011/0160913 A1 | 6/2011 | Parker et al. |
| 2011/0185895 A1 | 8/2011 | Freen |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0101637 A1 | 4/2012 | Imes et al. |
| 2012/0125559 A1* | 5/2012 | Fadell .................. F24F 11/0012 165/11.2 |
| 2012/0158350 A1 | 6/2012 | Steinberg et al. |
| 2012/0221151 A1 | 8/2012 | Steinberg |
| 2012/0252430 A1 | 10/2012 | Imes et al. |
| 2013/0238144 A1* | 9/2013 | Shahapurkar ........ F24F 11/0009 700/278 |
| 2015/0127170 A1* | 5/2015 | Quam .................. F24F 11/0086 700/276 |
| 2015/0248118 A1* | 9/2015 | Li .......................... G05B 13/04 700/295 |

FOREIGN PATENT DOCUMENTS

| | | |
|---|---|---|
| JP | 59106311 | 6/1984 |
| JP | 01252850 | 10/1989 |

OTHER PUBLICATIONS

Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.

(56) References Cited

OTHER PUBLICATIONS

Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
NetX RP32-Wifi Network Thermostat Consumer Brochure, Network Thermostat, May 2011, 2 pages.
NetX RP32-Wifi Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May, 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.

* cited by examiner

THERMODYNAMIC MODEL GENERATION AND IMPLEMENTATION USING OBSERVED HVAC AND/OR ENCLOSURE CHARACTERISTICS

TECHNICAL FIELD

This patent specification relates to systems, apparatus, methods, and related computer program products for controlling heating, ventilation, and air conditioning (HVAC) systems. More particularly, this patent specification relates to techniques for generating and implementing thermodynamic models of a structure in the management of HVAC systems that control a thermal environment of that structure.

BACKGROUND

To manage a thermal environment of a structure such as a residential or commercial building, one or more HVAC control systems are typically used. HVAC control systems need to make decisions as to how to condition the enclosure appropriately, which may include varying an internal heat, humidity, or other environmental characteristic. Since the enclosure has an associated thermal mass that needs to be heated or cooled, how and when the heating or cooling is carried out can greatly impact the energy efficiency as well as the cost of the process.

Conventionally, a model that attempts to specify how a structure will behave under the influence of an HVAC system is created based on a variety of factors such as structure size, number and characteristics of windows included in the structure, etc. That model is then used to specify the type and size of HVAC system to install and/or it is used by the HVAC control system throughout the lifetime of the building. For example, U.S. Pat. No. 7,072,727 discusses a method for determining heat loss of a building and for the proper sizing of HVAC equipment for the building.

It is also known for model updates to occur after installation through simple calculations such as adding heat and measuring time and temperature. For example, U.S. Pat. No. 5,555,927 discusses an adapted recovery method for a setback thermostat using the intersection of the space temperature with a sloped recovery temperature line which approximates the change in temperature as a function of time during recovery of the temperature controlled space from the setback temperature, to determine the time at which recovery to the occupancy temperature should begin. The recovery line slope is re-calculated and updated.

U.S. Patent Application Publication No. 2005/0192915 discusses a system for forecasting predicted thermal loads for a building including a neural-network-based thermal load predictor. The neural network can be trained using building data, occupancy data and actual weather conditions. A thermal condition forecaster uses a simple regression model based on forecasted high and low temperatures for a specific locale and measured local temperature and humidity observations made immediately prior to the prediction.

While such systems have evolved the technological field of HVAC control based on thermodynamic models of a structure, there remains significant room for improving the accuracy of the thermodynamic models in characterizing changes to a thermal environment of a structure over time as a result of actuation of an associated HVAC system.

BRIEF SUMMARY

Various embodiments described herein provide for systems, methods, and/or products that generate and/or fit a thermodynamic model for an enclosure and associated HVAC system. The thermodynamic model may include multiple basis functions, each having an associated weight. A response time, or response interval, can be determined for the enclosure, and can represent the time it takes for a current HVAC function to begin affecting the temperature in the enclosure during a current HVAC cycle. The thermodynamic model may include a first basis function representing the effect of a previous HVAC state that is evaluated during the response interval. A second basis function can represent the effect of the current HVAC state and can be evaluated after the response interval. Other basis functions (representing, e.g., diurnal sunlight effects, temperature drift, etc.) may also be evaluated before and/or after the response interval. The thermodynamic model may be used to characterized the thermodynamic behavior of the enclosure. In some embodiments, various processes such as predicting a thermodynamic response during a demand-response event, predicting a time-to-temperature interval, etc. may use the thermodynamic model to generate predictions of the thermodynamic behavior of the enclosure. Further, in some cases, the determined weights of the fitted thermodynamic model may be used to characterize various home/HVAC system properties, such as efficiency, insulation, and/or the like.

In some embodiments, a method of determining a thermodynamic model of an enclosure associated with an HVAC system is disclosed. The method may include receiving temperature information for a period of time during which the HVAC system operates in a first state, the temperature information defining a temperature trajectory of the enclosure during the period of time. The method may also include determining a response interval that indicates an estimated time between when the HVAC system begins operating in the first state and when the temperature within the enclosure begins to change in a direction associated with the first state. The method may additionally include determining, using the temperature information, a plurality of weighting factors corresponding to a respective plurality of basis functions, the weighted combination of basis functions characterizing the temperature trajectory of the enclosure in response to the HVAC system operating in the first state. The plurality of basis functions may include a first basis function that is evaluated from a time that the HVAC system begins operating in the first state until a time when the response interval ends, and a second basis function that is evaluated beginning at the time when the response interval ends.

In some embodiments, a thermostat for controlling operations of an HVAC system in an enclosure is disclosed. The thermostat may include HVAC control circuitry operable to actuate one or more elements of the HVAC system, one or more sensors for measuring environmental characteristics associated with the enclosure, and one or more processors coupled to the HVAC control circuitry and the one or more sensors. The one or more processors may be operable to cause the thermostat to perform operations including receiving temperature information for a period of time during which the HVAC system operates in a first state, the temperature information defining a temperature trajectory of the enclosure during the period of time. The operations may also include determining a response interval that indicates an estimated time between when the HVAC system begins operating in the first state and when the temperature within the enclosure begins to change in a direction associated with the first state. The operations may additionally include determining, using the temperature information, a plurality of weighting factors corresponding to a respective plurality of basis functions, the weighted combination of basis functions characterizing the temperature trajectory of the enclosure in response to the HVAC system operating in the first state. The plurality of basis functions may include a first basis function that is evaluated from a time that the HVAC system begins operating in the first state until a time when the response interval ends, and a second basis function that is evaluated beginning at the time when the response interval ends.

In some embodiments, a tangible, non-transitory, computer-readable storage medium is disclosed. The storage medium may include instructions that, when executed by one or more processors, cause the one or more processors to perform operations including receiving temperature information for a period of time during which the HVAC system operates in a first state, the temperature information defining a temperature trajectory of the enclosure during the period of time. The operations may also include determining a response interval that indicates an estimated time between when the HVAC system begins operating in the first state and when the temperature within the enclosure begins to change in a direction associated with the first state. The operations may additionally include determining, using the temperature information, a plurality of weighting factors corresponding to a respective plurality of basis functions, the weighted combination of basis functions characterizing the temperature trajectory of the enclosure in response to the HVAC system operating in the first state. The plurality of basis functions may include a first basis function that is evaluated from a time that the HVAC system begins operating in the first state until a time when the response interval ends, and a second basis function that is evaluated beginning at the time when the response interval ends.

In some embodiments, a method of determining a thermodynamic model of an enclosure associated with an HVAC system is disclosed. The method may include a means for receiving temperature information for a period of time during which the HVAC system operates in a first state, the temperature information defining a temperature trajectory of the enclosure during the period of time. The method may also include a means for determining a response interval that indicates an estimated time between when the HVAC system begins operating in the first state and when the temperature within the enclosure begins to change in a direction associated with the first state. The method may additionally include a means for determining, using the temperature information, a plurality of weighting factors corresponding to a respective plurality of basis functions, the weighted combination of basis functions characterizing the temperature trajectory of the enclosure in response to the HVAC system operating in the first state. The plurality of basis functions may include a first basis function that is evaluated from a time that the HVAC system begins operating in the first state until a time when the response interval ends, and a second basis function that is evaluated beginning at the time when the response interval ends.

A further understanding of the nature and advantages of the present invention may be realized by reference to the remaining portions of the specification and the drawings. Also note that other embodiments may be described in the following disclosure and claims.

DETAILED DESCRIPTION OF THE INVENTION

Figure 1:
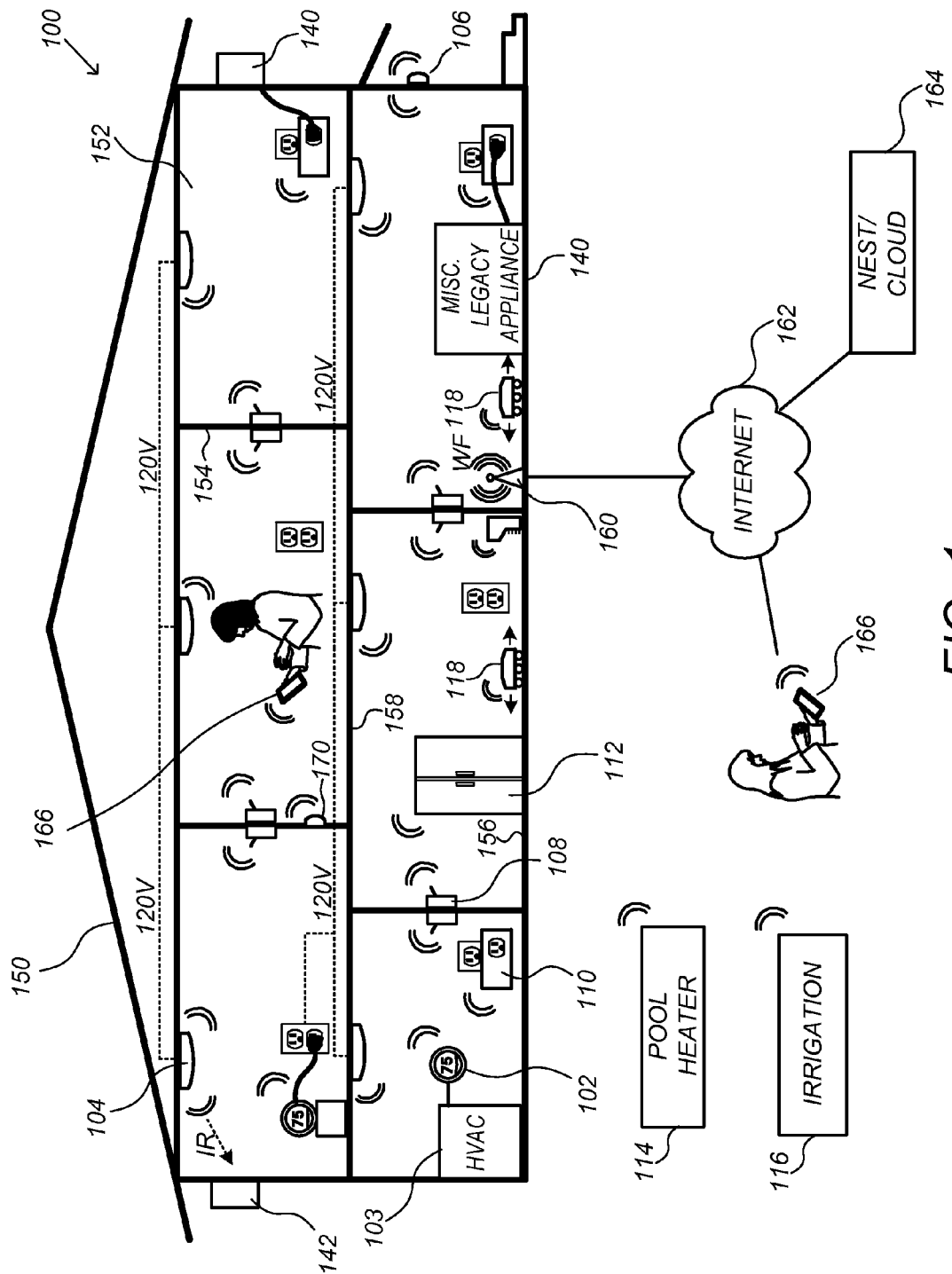
FIG. 1 is an example of a smart-home environment within which one or more of the devices, methods, systems, services, and/or computer program products described further herein will be applicable, according to an embodiment.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, intelligent thermostat systems according to one or more of the embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are methods and systems for setting up, pairing, controlling, and/or programming one or more of intelligent, network-connected, intelligent thermostat systems. These intelligent thermostat systems may be configured and adapted to be implemented in a smart home environment, seamlessly interacting with other devices in the smart home environment. The term "intelligent thermostat systems" is used herein to represent a particular combination of devices that can be configured to control an HVAC system in an enclosure, e.g., a home, an office or another structure. However, this intelligent thermostat system may also be capable of controlling other devices, controlling non-HVAC systems and events (e.g., security related events), and/or working in cooperation with other devices to provide additional features to the smart home environment. Again, it is within the scope of the present teachings for embodiments of the intelligent thermostat systems of the present invention to detect measurable characteristics other than environmental conditions (e.g., pressure, flow rate, height, position, velocity, acceleration, capacity, power, loudness, and brightness) and monitor and/or respond to one or more measurable characteristics of one or more physical systems.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

It is to be further appreciated that while the terms user, customer, installer, homeowner, occupant, guest, tenant, landlord, repair person, and the like may be used to refer to the person or persons who are interacting with the smart hazard detector or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices that can integrate seamlessly with each other and/or with a central server or a cloud-computing system to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a backplate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" for the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server.

Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 102, 104, 106, 108, 110, 112, 114, 116, 118, 166, and 170 (collectively referred to as "the smart devices") is capable of data communications and information sharing with any other of the smart devices, as well as to any central server or cloud-computing system or any other device that is network-connected within the smart-home environment 100 or anywhere else in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and, in some embodiments, may only communicate using wireless protocols that require very little power, such as Zigbee, ZWave, Bluetooth, 6LoWPAN, etc. Further, some, but not all, low-power nodes may be incapable of bidirectional communication. These low-power nodes may send messages, but they may be unable to "listen" for incoming messages. Thus, other devices in the smart-home environment 100, such as the spokesman nodes, may not send information to these low-power nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to some embodiments, the mesh network enables the central server or cloud-computing system 164 to regularly receive data from all of the smart devices in the home, make inferences based on the data, and send commands back to one of the smart devices to accomplish some of the smart-home objectives descried herein.

As described, the spokesman nodes and some of the low-powered nodes are capable of "listening". Accordingly, users, other devices, and the central server or cloud-computing system 164 can communicate control information to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 108, 110, 112, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 118 each configured to carry out, in an autonomous manner, any of a variety of household tasks. For some embodiments, the service robots 118 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 118 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 118 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 118 is configured to move itself into the immediate presence (e.g., within five feet) of a particular occupant who has settled into a particular location in the home (e.g. in the dining room to eat their breakfast and read the news). The localized-thermostat service robot 118 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 118 proceeds to move and park itself next to the couch and keep that particular immediate space at a comfortable temperature.

Technologies by which the localized-thermostat service robot 118 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 118 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 118 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 118, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 118 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 118 can be advised by other smart-home sensors that the temperature and humidity levels are rising in the kitchen, which is nearby to the occupant's current dining room location, and responsive to this advisory the hazard detector service robot 118 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 118 having respective dedicated ones of such functionalities, by a single service robot 118 having an integration of two or more different ones of such functionalities, and/or any combinations thereof (including the ability for a single service robot 118 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 118 will automatically dock and recharge its batteries (if needed) during periods of inactivity. Preferably, each service robot 118 includes wireless communication components that facilitate data communications with one or more of the other wirelessly communicating smart-home sensors of FIG. 1 and/or with one or more other service robots 118 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 118 can be configured to communicate directly with a remote server by virtue of cellular telephone communications, satellite communications, 3 G/4 G network data communications, or other direct communication method.

Provided according to some embodiments are systems and methods relating to the integration of the service robot(s) 118 with home security sensors and related functionalities of the smart home system. The embodiments are particularly applicable and advantageous when applied for those service robots 118 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
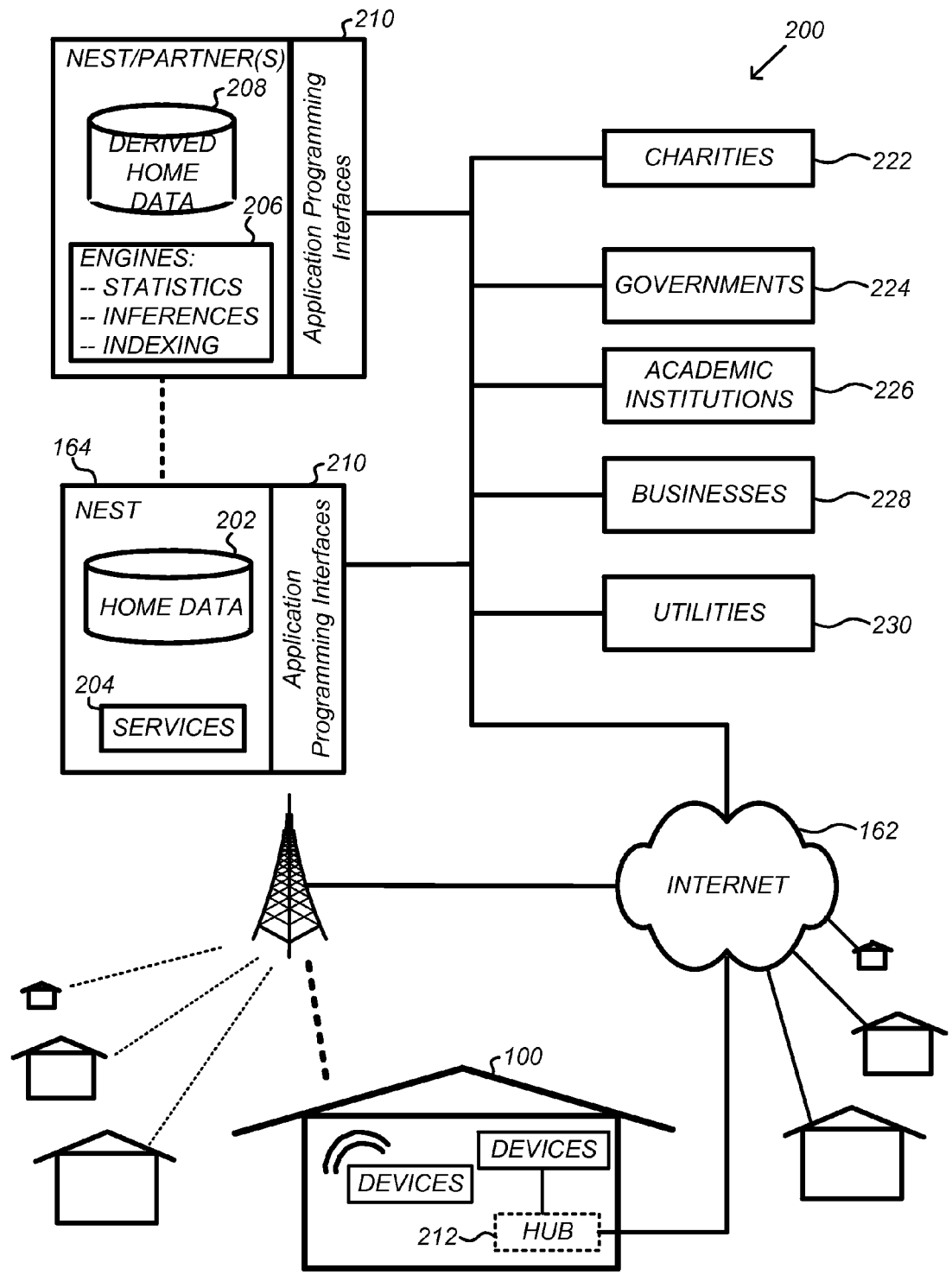
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the smart devices from FIG. 1 can communicate with the remote servers or cloud computing architectures 164. For example, a connection to the Internet 162 can be established either directly (for example, using 3 G/4 G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile applications, that integrate with the central server or the cloud-computing system 164 to provide services and information to users. Such programs and applications may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
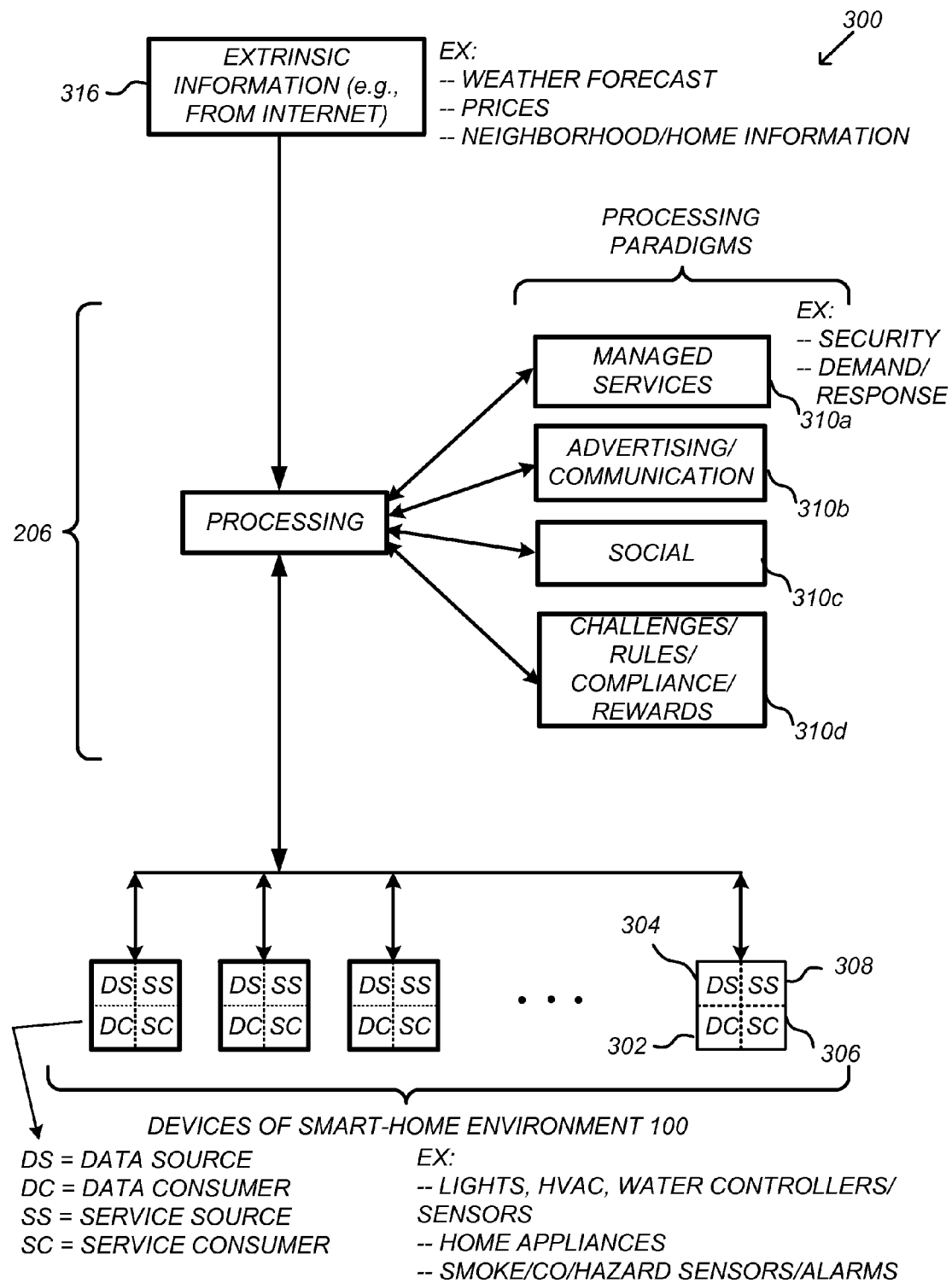
FIG. 3 illustrates an abstracted functional view of the extensible devices and services platform of FIG. 2, with reference to a processing engine as well as devices of the smart-home environment, according to an embodiment.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310*b* that estimates characteristics (e.g., demographic information), desires and/or products of interest of a user based on device usage. Services, promotions, products or upgrades can then be offered or automatically provided to the user. Processing engine 206 can further include a social paradigm 310*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.)

whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Figure 4A:
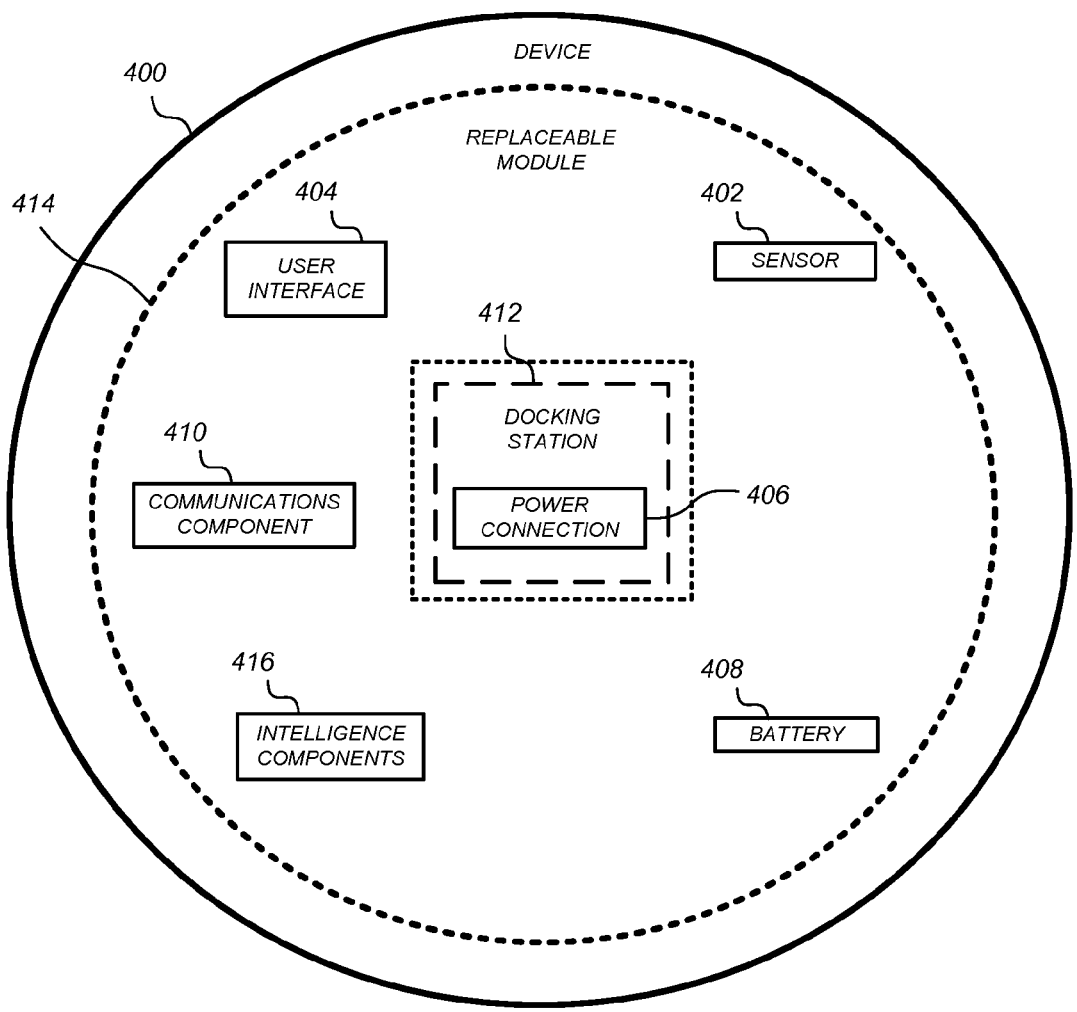
FIG. 4A illustrates an example of general device components which can be included in an intelligent, network-connected device that may be used to implement one or more of the thermodynamic behavior prediction processes described herein according to an embodiment.

FIG. 4A illustrates an example of general device components which can be included in an intelligent, network-connected device 400 (i.e., "device") that may be used to implement one or more of the thermodynamic behavior prediction processes described herein according to an embodiment. Each of one, more or all devices 400 within a system of devices can include one or more sensors 402, a user-interface component 404, a power supply (e.g., including a power connection 406 and/or battery 408), a communications component 410, a modularity unit (e.g., including a docking station 412 and replaceable module 414) and intelligence components 416. Particular sensors 402, user-interface components 404, power-supply configurations, communications components 410, modularity units and/or intelligence components 416 can be the same or similar across devices 400 or can vary depending on device type or model.

Sensors 402 as described herein generally includes devices or systems that measure and/or register a substance, physical phenomenon and/or physical quantity. The sensor may convert a measurement into a signal, which can be interpreted by an observer, instrument and/or system. A sensor can be implemented as a special purpose device and/or can be implemented as software running on a general-purpose computer system. By way of example and not by way of limitation, one or more sensors 402 in a device 400 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 402 can include temperature sensor(s), humidity sensor(s), hazard-related sensor(s) or other environmental sensor(s), accelerometer(s), microphone(s), optical sensor(s) up to and including camera(s) (e.g., charged-coupled-device or video cameras), active or passive radiation sensor(s), GPS receiver(s) or radio-frequency identification detector(s). While FIG. 4A illustrates an embodiment with a single sensor, many embodiments will include multiple sensors. In some instances, device 400 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 404 in device 400 may be configured to present information to a user via a visual display (e.g., a thin-film-transistor display or organic light-emitting-diode display) and/or an audio speaker and/or some other communication medium. User-interface component 404 can also include one or more user-input components to receive information from a user, such as a touchscreen, buttons, scroll component (e.g., a movable or virtual ring component), microphone or camera (e.g., to detect gestures). In one embodiment, user-input component 404 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 404 includes a camera, such that gestures can be detected (e.g., to indicate that a power or alarm state of a device is to be changed).

A power-supply component in device 400 may include a power connection 406 and/or local battery 408. For example, power connection 406 can connect device 400 to a power source such as a line voltage source. In some instances, connection 406 to an AC power source can be used to repeatedly charge a (e.g., rechargeable) local battery 408, such that battery 408 can later be used to supply power if needed in the event of an AC power disconnection or other power deficiency scenario.

A communications component 410 in device 400 can include a component that enables device 400 to communicate with a central server or a remote device, such as another device described herein or a portable user device. Communications component 410 can allow device 400 to communicate via one or more communication mechanisms such as Wi-Fi, ZigBee, 3 G/4 G wireless, CAT6 wired Ethernet, HomePlug or other powerline communications method, telephone, or optical fiber, by way of non-limiting examples. Communications component 410 can include a wireless card, an Ethernet plug, or another transceiver connection. In some embodiments, the communications component 410 facilitates communication with a central server to synchronize information between device 400, the central server, and in some cases additional devices. Techniques for synchronizing data between such devices are further described in the commonly assigned U.S. Ser. No. 13/624,892 (Ref. No. NES0231-US), filed Sep. 22, 2012, the contents of which are incorporated by reference herein in their entirety for all purposes.

A modularity unit in device 400 can include a static physical connection, and a replaceable module 414. Thus, the modularity unit can provide the capability to upgrade replaceable module 414 without completely reinstalling device 400 (e.g., to preserve wiring). The static physical connection can include a docking station 412 (which may also be termed an interface box) that can attach to a building structure. For example, docking station 412 could be mounted to a wall via screws or stuck onto a ceiling via adhesive. Docking station 412 can, in some instances, extend through part of the building structure. For example, docking station 412 can connect to wiring (e.g., to 120V line voltage wires) behind the wall via a hole made through a wall's sheetrock. Docking station 412 can include circuitry such as power-connection circuitry 406 and/or AC-to-DC powering circuitry and can prevent the user from being exposed to high-voltage wires. Docking station 412 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 412 are specific to a type or model of device, such that, e.g., a thermostat device includes a different docking station than a smoke detector device. In some instances, docking stations 412 can be shared across multiple types and/or models of devices 400.

Replaceable module 414 of the modularity unit can include some or all sensors 402, processors, user-interface components 404, batteries 408, communications components 410, intelligence components 416 and so forth of the device. Replaceable module 414 can be configured to attach to (e.g., plug into or connect to) docking station 412. In some instances, a set of replaceable modules 414 are produced with the capabilities, hardware and/or software, varying across the replaceable modules 414. Users can therefore easily upgrade or replace their replaceable module 414 without having to replace all device components or to completely reinstall device 400. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 416 of the device can support one or more of a variety of different device functionalities. Intelligence components 416 generally include one or more processors configured and programmed to carry out and/or cause to be carried out one or more of the advantageous functionalities described herein. The intelligence components 416 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 416 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 416 can be configured to detect when a location (e.g., a house or room) is occupied, up to and including whether it is occupied by a specific person or is occupied by a specific number and/or set of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 416 may include image-recognition technology to identify particular occupants or objects.

In some instances, intelligence components 416 can be configured to predict desirable settings and/or to implement those settings. For example, based on the presence detection, intelligence components 416 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 416 can initiate an audio or visual indicator of where the person, animal or object is or can initiate an alarm or security feature if an unrecognized person is detected under certain conditions (e.g., at night or when lights are out). As yet another example, intelligence components 416 can detect hourly, weekly or even seasonal trends in user settings and adjust settings accordingly. For example, intelligence components 416 can detect that a particular device is turned on every week day at 6:30 am, or that a device setting is gradually adjusted from a high setting to lower settings over the last three hours. Intelligence components 416 can then predict that the device is to be turned on every week day at 6:30 am or that the setting should continue to gradually lower its setting over a longer time period.

In some instances, devices can interact with each other such that events detected by a first device influence actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 4B:
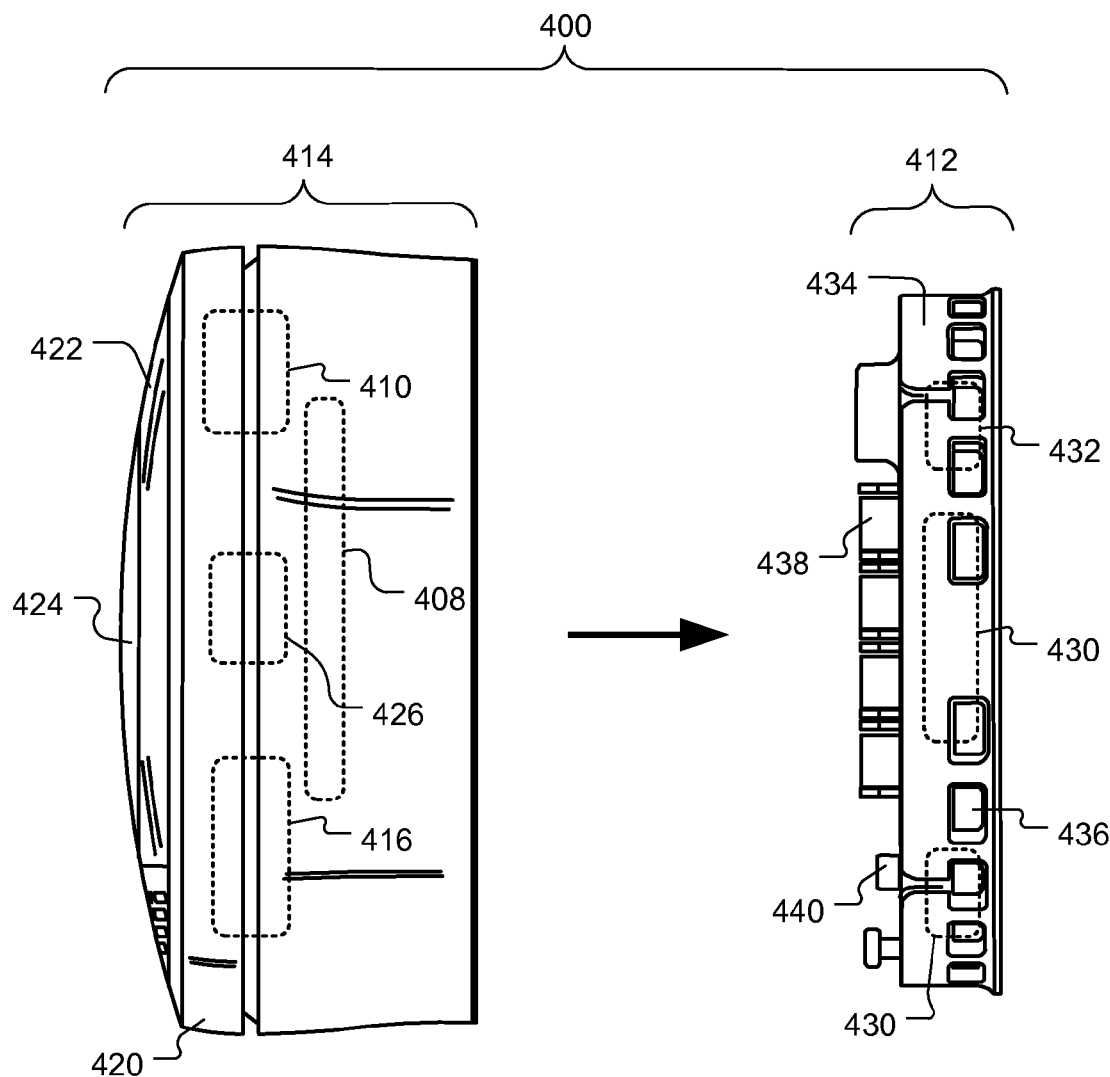
FIG. 4B illustrates an intelligent, network-connected device having a replaceable module and a docking station for ease of installation, configuration, and upgrading according to an embodiment.

FIG. 4B illustrates an intelligent, network-connected device 400 having a replaceable module 414 (e.g., a head unit) and a docking station 412 (e.g., a back plate) for ease of installation, configuration, and upgrading according to an embodiment. As is described hereinabove, device 400 may be wall mounted, have a circular shape, and have an outer rotatable ring 420 (that may be, e.g., part of user interface 404) for receiving user input. Outer rotatable ring 420 allows the user to make adjustments, such as selecting a new target temperature. For example, by rotating outer ring 420 clockwise, a target setpoint temperature can be increased, and by rotating the outer ring 420 counter-clockwise, the target setpoint temperature can be decreased. Changes to an existing setpoint temperature that reflect a desire for the temperature in the structure to be immediately changed to that setpoint temperature may herein be referred to as changes to an "immediate setpoint temperature" or a "current setpoint temperature". This is in contrast to setpoint temperatures that may be provided in a hourly, daily, weekly, monthly, or other schedule in which setpoint temperatures may reflect a desire for future temperatures in the structure. Such setpoint temperatures may herein be referred as "scheduled setpoint temperature" or as a "schedule of setpoint temperatures".

Device 400 has a cover 422 that includes a display 424 (that may be, e.g., part of user interface 404). Head unit 414 slides onto back plate 412. Display 424 may display a variety of information depending on, e.g., a current operational state of the device 400, direct user interaction with the device via ring 420, sensed presence of the user via, e.g., a proximity sensor 402 (such as a passive infrared motion sensor), remote user interaction with the device via a remote access device, etc. For example, display 424 may display central numerals that are representative of a current setpoint temperature.

According to some embodiments the connection of the head unit 414 to back plate 412 can be accomplished using magnets, bayonet, latches and catches, tabs or ribs with matching indentations, or simply friction on mating portions of the head unit 414 and back plate 412. According to some embodiments, the head unit 414 includes battery 408, communications component 410, intelligence components 416, and a display driver 426 (that may be, e.g., part of user interface 404). Battery 408 may be recharged using recharging circuitry (that may be, e.g., part of intelligence components 416 and/or may be included in the back plate 412) that uses power from the back plate 412 that is either obtained via power harvesting (also referred to as power stealing and/or power sharing) from the HVAC system control circuit(s) or from a common wire, if available, as described in further detail in commonly assigned co-pending U.S. Ser. No. 13/034,674 (Ref. No. NES0006-US) and Ser. No. 13/034,678 (Ref. No. NES0007-US), both filed Feb. 24, 2011, and commonly assigned U.S. Ser. No. 13/267,871 (Ref. No. NES0158-US), filed Oct. 6, 2011, all of which are incorporated by reference herein in their entirety for all purposes. According to some embodiments, battery 408 is a rechargeable single cell lithium-ion, or a lithium-polymer battery.

Back plate 412 includes electronics 430 and a temperature sensor 432 (that may be, e.g., one of sensors 402) in housing 434, which are ventilated via vents 436. Temperature sensor 432 allows the back plate 412 to operate as a fully functional thermostat even when not connected to the head unit 414. Wire connectors 438 are provided to allow for connection to HVAC system wires, such as connection to wires for actuating components of the HVAC system, wires for receiving power from the HVAC system, etc. Connection terminal 440 is a male or female plug connector that provides electrical connections between the head unit 414 and back plate 412. Various arrangements for connecting to and controlling an HVAC system are further described in U.S. Ser. Nos. 13/034,674 and 13/034,678, supra.

In some embodiments, the back plate electronics 430 includes an MCU processor, and driver circuitry for opening and closing the HVAC control circuits, thereby turning on and turning off the one or more HVAC functions such as heating and cooling. The electronics 430 also includes flash memory which is used to store a series of programmed settings that take effect at different times of the day, such that programmed setpoint (i.e., desired temperature) changes can be carried out even when the head unit 414 is not attached to the back plate 412. According to some embodiments, the electronics 430 also includes power harvesting circuitry (that may be in addition or alternatively to that provided in head unit 414) to obtain power from the HVAC control circuit(s) even when an HVAC common power wire is not available.

Device 400 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 4A and 4B. Thus, the depiction of device 400 in FIGS. 4A and 4B should be taken as being illustrative in nature, and not limiting to the scope of the present teachings.

Figure 5:
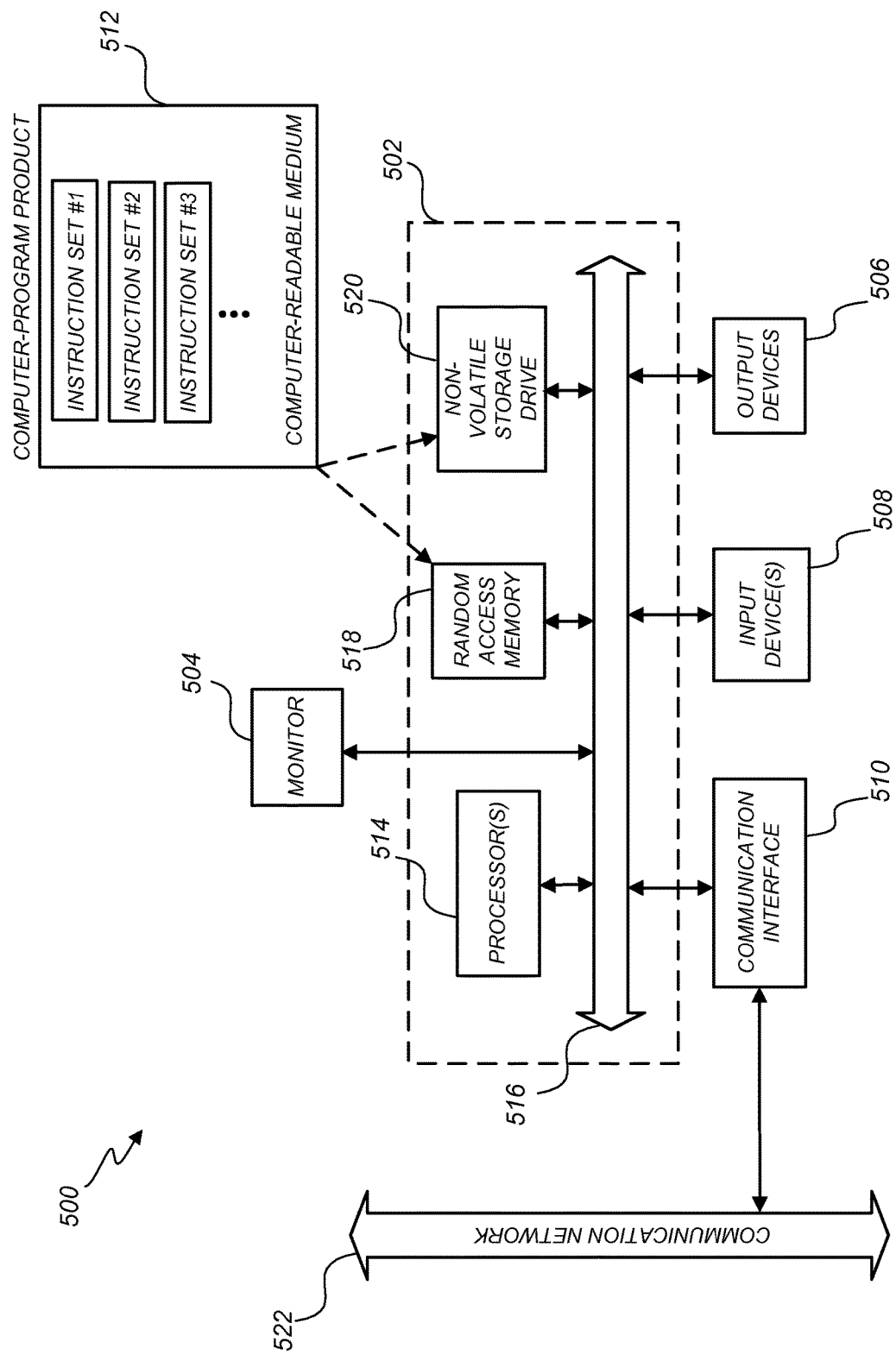
FIG. 5 is a block diagram of a special-purpose computer system according to an embodiment.

FIG. 5 is a block diagram of a special-purpose computer system 500 according to an embodiment. For example, one or more of device 400, elements of smart home environment 100, remote server 164, processing engine 206, or other electronic components described herein may be implemented as a special-purpose computer system 500. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 500 comprises a computer 502, a monitor 504 coupled to computer 502, one or more additional user output devices 506 (optional) coupled to computer 502, one or more user input devices 508 (e.g., keyboard, mouse, track ball, touch screen) coupled to computer 502, an optional communications interface 510 coupled to computer 502, and a computer-program product including a tangible computer-readable storage medium 512 in or accessible to computer 502. Instructions stored on computer-readable storage medium 512 may direct system 500 to perform the methods and processes described herein. Computer 502 may include one or more processors 514 that communicate with a number of peripheral devices via a bus subsystem 516. These peripheral devices may include user output device(s) 506, user input device(s) 508, communications interface 510, and a storage subsystem, such as random access memory (RAM) 518 and non-volatile storage drive 520 (e.g., disk drive, optical drive, solid state drive), which are forms of tangible computer-readable memory.

Computer-readable medium 512 may be loaded into random access memory 518, stored in non-volatile storage drive 520, or otherwise accessible to one or more components of computer 502. Each processor 514 may comprise a microprocessor, such as a microprocessor from Intel® or Advanced Micro Devices, Inc.®, or the like. To support computer-readable medium 512, the computer 502 runs an operating system that handles the communications between computer-readable medium 512 and the above-noted components, as well as the communications between the above-noted components in support of the computer-readable medium 512. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 508 include all possible types of devices and mechanisms to input information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 508 are typically embodied as a computer mouse, a trackball, a track pad, a joystick, wireless remote, a drawing tablet, a voice command system. User input devices 508 typically allow a user to select objects, icons, text and the like that appear on the monitor 504 via a command such as a click of a button or the like. User output devices 506 include all possible types of devices and mechanisms to output information from computer 502. These may include a display (e.g., monitor 504), printers, non-visual displays such as audio output devices, etc.

Communications interface 510 provides an interface to other communication networks and devices and may serve as an interface to receive data from and transmit data to other systems, WANs and/or the Internet, via a wired or wireless communication network 522. Embodiments of communications interface 510 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 510 may be coupled to a computer network, to a FireWire® bus, or the like. In other embodiments, communications interface 510 may be physically integrated on the motherboard of computer 502, and/or may be a software program, or the like.

RAM 518 and non-volatile storage drive 520 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 518 and non-volatile storage drive 520 may be configured to store the basic programming and data constructs that provide the functionality of various embodiments of the present invention, as described above.

Software instruction sets that provide the functionality of the present invention may be stored in computer-readable medium 512, RAM 518, and/or non-volatile storage drive 520. These instruction sets or code may be executed by the processor(s) 514. Computer-readable medium 512, RAM 518, and/or non-volatile storage drive 520 may also provide a repository to store data and data structures used in accordance with the present invention. RAM 518 and non-volatile storage drive 520 may include a number of memories including a main random access memory (RAM) to store of instructions and data during program execution and a read-only memory (ROM) in which fixed instructions are stored. RAM 518 and non-volatile storage drive 520 may include a file storage subsystem providing persistent (non-volatile) storage of program and/or data files. RAM 518 and non-volatile storage drive 520 may also include removable storage systems, such as removable flash memory.

Bus subsystem 516 provides a mechanism to allow the various components and subsystems of computer 502 communicate with each other as intended. Although bus subsystem 516 is shown schematically as a single bus, alternative embodiments of the bus subsystem may utilize multiple busses or communication paths within the computer 502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

Figure 6:
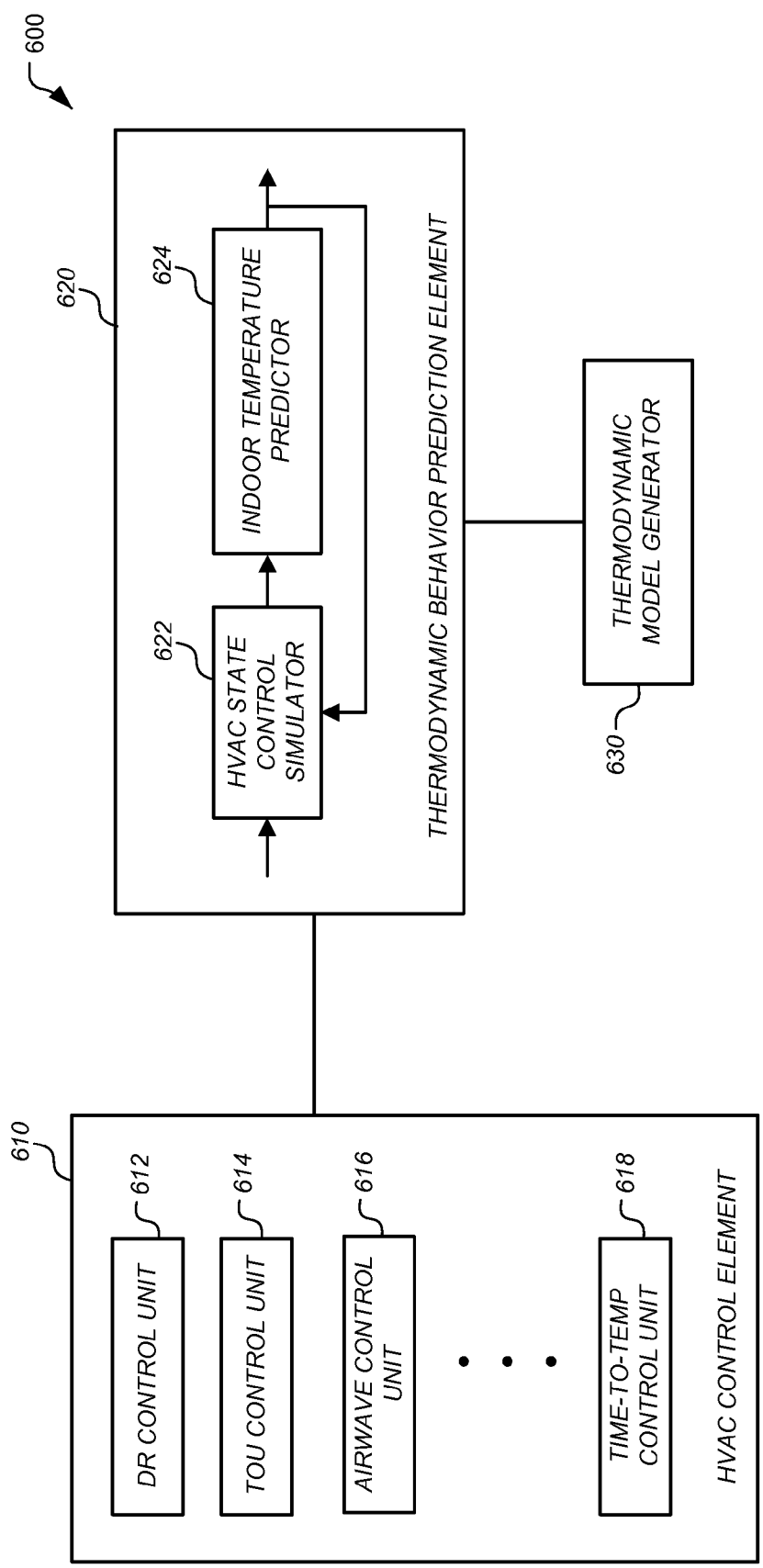
FIG. 6 illustrates a block diagram of components of an HVAC control system implementing thermodynamic behavioral modeling according to an embodiment.

FIG. 6 illustrates components of an HVAC control system 600 implementing thermodynamic behavioral modeling according to some embodiments. To facilitate understanding, the system 600 is described with reference to FIGS. 1, 4A, 4B, and 5, although it should be understood that embodiments of the system 600 are not limited to the exemplary apparatus and systems described with reference to FIGS. 1, 4A, 4B, and 5.

HVAC control system 600 according to various embodiments is operable to implement a variety of HVAC control algorithms for intelligently controlling the indoor environmental conditions of a structure via an HVAC system. One of more of the HVAC control algorithms may rely, either directly or indirectly, on thermodynamic predictions that predict the environmental response of a structure to changes in actuation state of an associated HVAC system. The thermodynamic predictions, in turn, may be generated based at least in part on a thermodynamic model of the structure, where the thermodynamic model characterizes an environmental characteristic trajectory of the structure in response to application of an HVAC actuation state. The characterized environmental characteristic trajectory may be a trajectory of one or more of a variety of environmental conditions internal to the structure, including but not limited to indoor temperature and indoor humidity.

HVAC control system 600 according to some embodiments includes a variety of components, such as an HVAC control element 610, a thermodynamic behavior prediction element 620, and a thermodynamic model generator 630. Each of these components may be physically, logically, or communicatively coupled to one another, and in some embodiments the structural elements and/or functionality thereof described herein for one or more components of system 600 may similarly be implemented in other components of system 600. Moreover, the components of system 600 can be implemented in hardware, software, or any combination thereof, and while in one embodiment the components of system 600 may be implemented in device 400, other embodiments are not so limited as either some or all of the components may be implemented in electronic devices (e.g., devices associated with smart home environment 100 such as portable electronic device 166 and/or remote server 164) other than device 400.

HVAC control element 610 includes HVAC control logic that, for one or more of a variety of reasons, may wish to obtain and use a prediction of the thermodynamic behavior of a structure. For example, one or more HVAC control algorithms implemented by thermostat 102 may rely on a prediction of the thermodynamic behavior of structure 150 to increase the accuracy of HVAC control. The HVAC element 610 may include HVAC control logic that spans a variety of possibilities, and may include and be implemented in, for example, a demand-response control unit 612, a time-of-use control unit 614, an airwave control unit 616, and a time-to-temperature control unit 618.

The demand-response (DR) control unit 612 may be operable to control the HVAC system, e.g., HVAC 103, for a DR event. DR control unit 612 may include various control logic for facilitating such control, and in some cases such control logic may control the HVAC system so as to shift energy consumption from within a DR event period (i.e., a period of time during which reduced energy consumption is desired) to one or more time periods outside of the DR event period. In performing such control, the DR control unit 612 may at least partially rely on one or more predictions of the thermodynamic behavior of the structure. Various techniques for controlling an HVAC system in response to a DR event are described in commonly assigned U.S. Ser. No. 13/842,213 (Ref. No. NES0253-US), filed Mar. 15, 2013, titled "Systems, Apparatus and Methods for Managing Demand-Response Programs and Events," and U.S. Ser. No. 13/866,635 (Ref. No. NES0340-US), filed Apr. 19, 2013, titled "Controlling An HVAC System In Association With a Demand-Response Event," both of which are incorporated by reference herein in their entirety for all purposes.

The time-of-use (TOU) control unit 614 may be operable to control the HVAC system in environments where there is a dynamic pricing of energy. That is, the price per unit of energy as seen by the consumer may vary over the course of the day. The TOU control unit in this case may include various control logic for facilitating control of the HVAC system so as to achieve desired levels of occupant comfort while efficiently consuming energy over the course of the day in accordance with the dynamic pricing. In performing such control, the TOU control unit 614 may at least partially rely on one or more predictions of the thermodynamic behavior of the structure. Various techniques for performing time-of-use HVAC system control are described in commonly assigned filed U.S. Ser. No. 13/866,578 (Ref. No. NES0211-US), filed on Apr. 19, 2013, titled "Automated Adjustment of an HVAC Schedule for Resource Conservation," which is incorporated by reference herein in its entirety for all purposes.

The airwave control unit 616 may be operable to independently control an air compressor and fan for an air conditioning element of the HVAC system. While cooling the internal temperature of a structure to reach a desired setpoint temperature, airwave control unit 616 may disengage or otherwise turn off the compressor prior to reaching the desired setpoint temperature, while keeping the fan on for a certain period of time. In such a case, energy consumption by the HVAC system may be reduced while still achieving desired setpoint temperatures. In performing such control, the airwave control unit 616 may at least partially rely on one or more predictions of the thermodynamic behavior of the structure. Various techniques for independently controlling an air compressor and fan for an air conditioning element of the HVAC system are described in commonly assigned U.S. Ser. No. 13/434,573 (Ref. No. NES0208-US), filed Mar. 29, 2012, which is incorporated by reference herein in its entirety for all purposes.

The time-to-temperature control unit 618 may be operable to calculate and, in some embodiments, communicate to the user, the amount of time needed for the HVAC system to cause the internal temperature of the structure to reach a desired setpoint temperature. The use of such calculations may not be limited to communication to the user, but could also be used by other HVAC control logic, and the control unit 618 may not be limited to determining the time needed to reach a desired temperature but could also include logic for determining the time needed to reach other indoor environmental characteristics, such as a particular humidity level. In determining the time needed to reach an indoor environmental characteristic, the time-to-temperature control unit 618 may at least partially rely on one or more predictions of the thermodynamic behavior the structure. Various techniques for performing time-to-temperature control are described in commonly assigned U.S. Ser. No. 12/984,602 (Ref. No. NES019-US), filed Jan. 4, 2011, and U.S. Ser. No. 13/632,028 (Ref. No. NES0124-US), filed Sep. 30, 2012, both of which are incorporated by reference herein in their entirety for all purposes.

It should be recognized that embodiments are not limited to HVAC control element 610 including the specific control units described herein, but rather could include one or more of a variety of control units that rely, at least in part, on a prediction of the thermodynamic behavior of a structure. To facilitate acquiring information indicative of such a prediction, in some embodiments the HVAC control element 610, or one or more units included therein, may communicate to the thermodynamic behavior prediction element 620 a request for a prediction of the thermodynamic behavior of the structure over a prediction time period. In some specific embodiments, the request may include a request for an expected indoor temperature profile, an expected indoor humidity profile, or a profile characterizing one or more other expected indoor environmental characteristics. The request may include some, none, or all of a variety of information in support of the request. For example, the request may include a desired HVAC control trajectory that characterizes the desired control of the HVAC system over the prediction time period. The HVAC control trajectory in some embodiments may be, e.g., a schedule of setpoint temperatures for the prediction time period.

Thermodynamic behavior prediction element 620 includes computational logic that is operable to predict the thermodynamic behavior of a structure at least in part in response to a desired HVAC control trajectory. The thermodynamic behavior prediction element 620 may include a variety of computational logic for generating such predictions, such as an HVAC state control simulator 622 and an indoor temperature predictor 624.

The HVAC state control simulator 622 is operable to simulate actuation of one or more stages of an HVAC system based on a desired environmental condition (e.g., a desired indoor temperature) and a current environmental condition (e.g., a current indoor temperature). In simulating the actuation of the HVAC stages, HVAC state control simulator 622 may receive information indicative of the desired environmental condition (e.g., the desired indoor temperature), and information indicative of the corresponding current environmental condition (e.g., the current indoor temperature), and apply a set of HVAC stage control logic to determine, and output, information indicative of one or more simulated HVAC actuation states. For example, in temperature control simulations, if a desired indoor temperature is higher than the current indoor temperature, then the HVAC state control simulator 622 may output information indicative of actuation of one or more HVAC heating stages. Similarly, if a desired indoor temperature is lower than the current indoor temperature, then the HVAC state control simulator 622 may output information indicative of actuation of one or more HVAC cooling stages. It should be recognized that embodiments are not limited to these particular examples. For example, HVAC systems may include one or more of a variety of stages, a fan stage, first and second heating stages, an emergency heating stage, first and second cooling stages, a humidifier stage, etc., where the stages may be independently (or dependent on one another) actuated.

The indoor temperature predictor 624 is operable to determine an expected change in the current environmental condition (e.g., a change in the current indoor temperature) in response to the simulated actuation state(s) of the HVAC stage(s). In determining the expected change in the current environmental condition, the indoor temperature predictor 624 may rely on a thermodynamic model of the structure that specifies how the structure will behave, thermodynamically, under the influence of an HVAC control system. In some relatively simple cases only one thermodynamic model of the structure may exist, and thus the indoor temperature predictor 624 may rely on that single model to determine the expected changes in the structure's environmental conditions. In other cases, however, a number of models may exist, in which case the indoor temperature predictor 624 may use the most suitable model. For example, different models may be associated with different HVAC actuation states, such as a model being associated with stage one heating being actuated, a different model being associated with stage one cooling being actuated, and yet a different model being associated with stage one heating and a fan being actuated. The most suitable model may thus depend on which HVAC stages are actuated by the HVAC state control simulator 622 and as defined by the information indicative of one or more simulated HVAC actuation states received by the HVAC state control simulator 622. It should also be recognized that in some embodiments, the thermodynamic model(s) may be revised over time so as to, for example, ensure that the applied model accurately reflects the most recent behavioral characteristics of the structure.

In determining the expected change in the current environmental condition, in addition to a thermodynamic model, the indoor temperature predictor 624 may also acquire and use a variety of information. For example, the indoor temperature predictor 624 may acquire and use information such as an expected outdoor environmental characteristic (e.g., an expected outdoor temperature), an expected structural environmental characteristic (e.g., an expected temperature of the structure), a time that is local to the structure for which the environmental characteristics are being determined, etc. In some particular embodiments, some or all of such information may be used with the thermodynamic model in determining the expected thermodynamic behavior of the structure.

In some particular embodiments, the thermodynamic behavior prediction element 620 may receive a schedule of setpoint temperatures ($T_{schedule}$) as information indicative of a desired environmental condition. The schedule $T_{schedule}$ may be implemented as a vector of discrete time-wise elements, where each element is represented by $T_{schedule}(k)$. Thermodynamic behavior prediction element 620 may sequentially apply the setpoint temperatures defined by the vector $T_{schedule}(k)$ to the HVAC state control simulator 622. The HVAC state control simulator 622 then, in turn for each setpoint temperature, determines an appropriate HVAC actuation state. The HVAC actuation states may similarly be implemented as a vector of discrete time-wise elements U(k) (for each HVAC stage), where each element is sequentially output by the HVAC state control simulator 622 in response to input of a corresponding schedule element $T_{schedule}(k)$. Each discrete time-wise element U(k) may then be applied to the indoor temperature predictor 624 which, for each element U(k), determines and outputs an expected change in indoor temperature, $T_{in}(k+1)$. For each time increment the expected change in indoor temperature $T_{in}(k+1)$ may be fed back to the HVAC state control simulator 622 so that the HVAC state control simulator 622 may determine the expected indoor temperature for comparison with the input setpoint temperature. Once all timesteps have been simulated so that the entire prediction time period has been simulated, the discrete HVAC actuation state elements U(k) may be aggregated to generate an expected HVAC actuation control trajectory and the expected changes in indoor temperature $T_{in}(k+1)$ may be aggregated to generate an expected indoor temperature profile.

Thermodynamic model generator 630 includes computational logic that is operable to identify, and in some cases generate, a thermodynamic model for use by the thermodynamic behavior prediction element 620. In some embodiments, the thermodynamic behavior prediction element 620 may be coupled to or otherwise in communication with the thermodynamic model generator 630. In situations where the thermodynamic behavior prediction element 620 is requested to determine an expected thermodynamic behavior of a structure, the thermodynamic prediction element 620 may request a thermodynamic model from the thermodynamic model generator 630. In cases where a single model is used to characterize an environmental characteristic trajectory of the structure, the request may simply request a current version of that model. In cases where a number of different models may be used, the request may include information identifying the actuation state of the HVAC system to assist the thermodynamic model generator 630 in identifying or generating the most suitable model.

As mentioned, the indoor temperature predictor 624 may acquire a thermodynamic model of the structure for characterizing an environmental characteristic trajectory of the structure. In some particular embodiments, the model may be founded upon a preselected, predetermined plurality of basis functions that characterize a contribution of a plurality of basis factors, some of them having direct physical significance and others having only associative mathematical significance on the environmental characteristic trajectory in response to an actuation state of the HVAC system. The basis functions may include one or more of a variety of functions that are indicative of, for example, an effect from a given HVAC stage, an effect from a previous cycle, a difference in outdoor and indoor temperature, and an effect caused by factors other than environmental factors. In some specific embodiments, such basis functions may include one or more of the following:

(a) a function representative of an effect of the previous HVAC cycle that lasts until an initiated HVAC cycle begins to take effect (e.g., when a temperature change switches direction due to the initiated HVAC cycle);

(b) a function representative of a primary effect of the initiated HVAC function of the current HVAC cycle that begins when the initiated HVAC cycle begins to take effect (e.g., when a temperature change switches direction due to the initiated HVAC cycle);

(c) a function representative of the effect of the difference between the outdoor temperature and the indoor temperature; and/or (d) a function representative of the effect of the local time of day that approximates the effect of sunlight.

Each of these four basis functions will be described in greater detail below. However, it should be noted that these basis functions are merely exemplary and not meant to be limiting. Other embodiments may use other basis functions not specifically listed herein. For example, some embodiments may include an HVAC effectiveness term that indicates how effective the HVAC is to condition an enclosure under varying outdoor temperatures. For example, an efficient HVAC system may have relatively constant duty cycle lengths to condition an enclosure given a particular indoor/outdoor temperature difference over a wide range of outdoor temperatures, whereas an inefficient HVAC system may have a (relatively) wide range of duty cycle lengths to condition an enclosure given a particular indoor/outdoor temperature difference over a wide range of outdoor temperatures. In any case, it should be recognized that various basis functions may be used according to different thermodynamic models that would be most appropriate according to various structure types, climates, user preferences, HVAC system types, etc.

As used herein, "cycle" refers to a period during which a particular HVAC actuation state is in effect with respect to the energy-consuming parameters (i.e., actuation stage(s)) of interest for the model being considered. For example, consider a scenario in which the parameter of interest is simply whether the heating is ON or OFF. In a simple single-stage HVAC system, the time that the HVAC is ON and then OFF represents two distinct consecutive cycles. However, in a more complex HVAC system having multiple stages such as a heating stage and a fan, the time that heater is on (regardless of fan state), and then the heater is off (regardless of fan state), represents two distinct consecutive cycles. In this more complex system, the state of the fan does not impact the duration of the cycle since the parameter of interest for the particular model is only concerned with the state of the heater.

A first type of basis function may be representative of an effect of a previous HVAC cycle. The effect of the previous HVAC cycle may dominate the change in the predicted temperature during the initial stages of the current HVAC cycle. This effect will generally decay as the time into the current HVAC cycle increases. This initial interval where the effect of the previous HVAC cycle will dominate the thermodynamic model may be referred to as "early-cycle activity." During early-cycle activity, most of the temperature change effect will be carried over from the previous HVAC cycle while the HVAC system ramps up in the current cycle. For example, when turning on an air conditioner (i.e., actuating the AC HVAC function) the effect of the prior HVAC cycle will dominate until the air conditioner is able to cool the heat exchange coils, cool the vents, etc., such that the air within the structure will begin to cool. Continuing this example, the prior HVAC cycle may be in a drift state, where the HVAC system is neither actively heating nor cooling the structure. As a result, where the outdoor temperature is greater than the indoor temperature, the indoor temperature will tend to drift higher. Therefore, early-cycle activity in this example will see the indoor air temperature continue to drift upwards until the effect of the air conditioner begins to dominate and begin reducing the indoor temperature. Depending on various factors, the early-cycle activity may last for a certain period of time, such as 1 minute, 3 minutes, 5 minutes, 10 minutes, in a range from 1-10 minutes, for less than 1 minute, or for more than 10 minutes.

In some embodiments, a basis function in the thermodynamic model representing this early-cycle activity can be represented by the average temperature change in a time interval that precedes the current HVAC cycle, and may be given by:

$$w_1 \cdot \frac{\frac{dT}{dt_{previous\ cycle}}}{t_{cycle}}. \quad (1)$$

In equation (1), $w_1$ represents a weight for the basis function, and $dT/dt_{previous\ cycle}$ represents the final temperature derivate of the previous cycle. In some cases, $dT/dt_{previous\ cycle}$ may represent the average temperature change over a period of time (such as, for example, the last 1 minute of the previous HVAC cycle, the last 3 minutes of the previous HVAC cycle, the last 5 minutes of the previous HVAC cycle, the last 10 minutes of the previous HVAC cycle, a period less than 1 minute, greater than 10 minutes, or in a range from 1 to 10 minutes). Further, $t_{cycle}$ represents the elapsed time since the beginning of the current HVAC cycle. It should be noted that other embodiments may use other basis functions to represent the early-cycle activity. For example, some embodiments may use any function that has a maximum at the beginning of the current HVAC cycle that decays over time.

A second type of basis function may be representative of a primary effect of the HVAC function of the current HVAC cycle. The portion of the current HVAC cycle that is dominated by the effect of the current HVAC function may be referred to as "steady-state activity," or "middle-cycle activity." During steady-state activity, the effect of the previous HVAC cycle is overcome by the HVAC function of the current cycle. In some embodiments, the basis function during steady-state activity may be affected by changes in the outdoor temperature, the structure temperature, and/or the time of day. In the simplified example given above in which an air-conditioning function is actuated, the steady-state activity could be characterized by the indoor temperature beginning to drop instead of drifting upwards.

The effect of the current HVAC function may gradually diminish throughout the steady-state activity as the indoor temperature moves towards the temperature setpoint and away from the outdoor temperature. Therefore, some embodiments may use a basis function that demonstrates a decay over time. For example, some embodiments may use a functional form that describes the decaying effect of the HVAC function over the current HVAC cycle such as:

$$\left(\frac{1}{t_{cycle}}\right)^p \quad (2)$$

where $t_{cycle}$ again represents the elapsed time since the beginning of the current HVAC cycle, and p represents a constant based on empirical testing. In some embodiments, p=0.2 has been shown to yield favorable results, but is not so limited. For example, other values of p may include p=0.01, p=0.5, p=0.75, p=1, 0.01<p<1, p≤0.01, and p≥1. In some embodiments, the value of p may be optimized for each structure in which the thermostat is installed. For example, the value of p may be optimized over a learning interval, such as the first 10 days after the thermostat is installed in the structure. In some embodiments, the value of p may be optimized for a class of structures. For example, a central thermostat management server may be configured to collect data from a plurality of thermostats, group the data according to common characteristics of the structures or the inhabitants thereof, and generate values of p that can be used in each of these structures.

The effect of the current HVAC cycle can also be affected by the effectiveness of the HVAC system. In at least one respect, how effective an HVAC system is at reaching or maintaining a desired setpoint temperature depends on an outdoor temperature and, more specifically, a difference between the outdoor temperature $T_{out}$ and the indoor temperature $T_{in}$. For example, when an outdoor temperature is very high relative to an indoor temperature, the effectiveness of the HVAC system in maintaining (or changing in accordance with a desired setpoint) the indoor temperature is relatively low as the HVAC system may need to expend significant energy in maintaining the temperature differential and, in some cases, may have insufficient capacity to maintain the indoor temperature. Mechanically, this may be due to the HVAC system having to cool very hot outdoor air before injecting it within the enclosure, where if the outdoor air is simply too hot, the HVAC system may have insufficient capacity to reduce the outdoor air temperature to the indoor air temperature. Conversely, when the outdoor temperature is approximately equal to the indoor temperature, the effectiveness of the HVAC system in maintaining (or changing in accordance with a desired setpoint) the indoor temperature is relatively high as the HVAC system may not need to expend very much energy to maintain the relatively small temperature differential.

Figure 7:
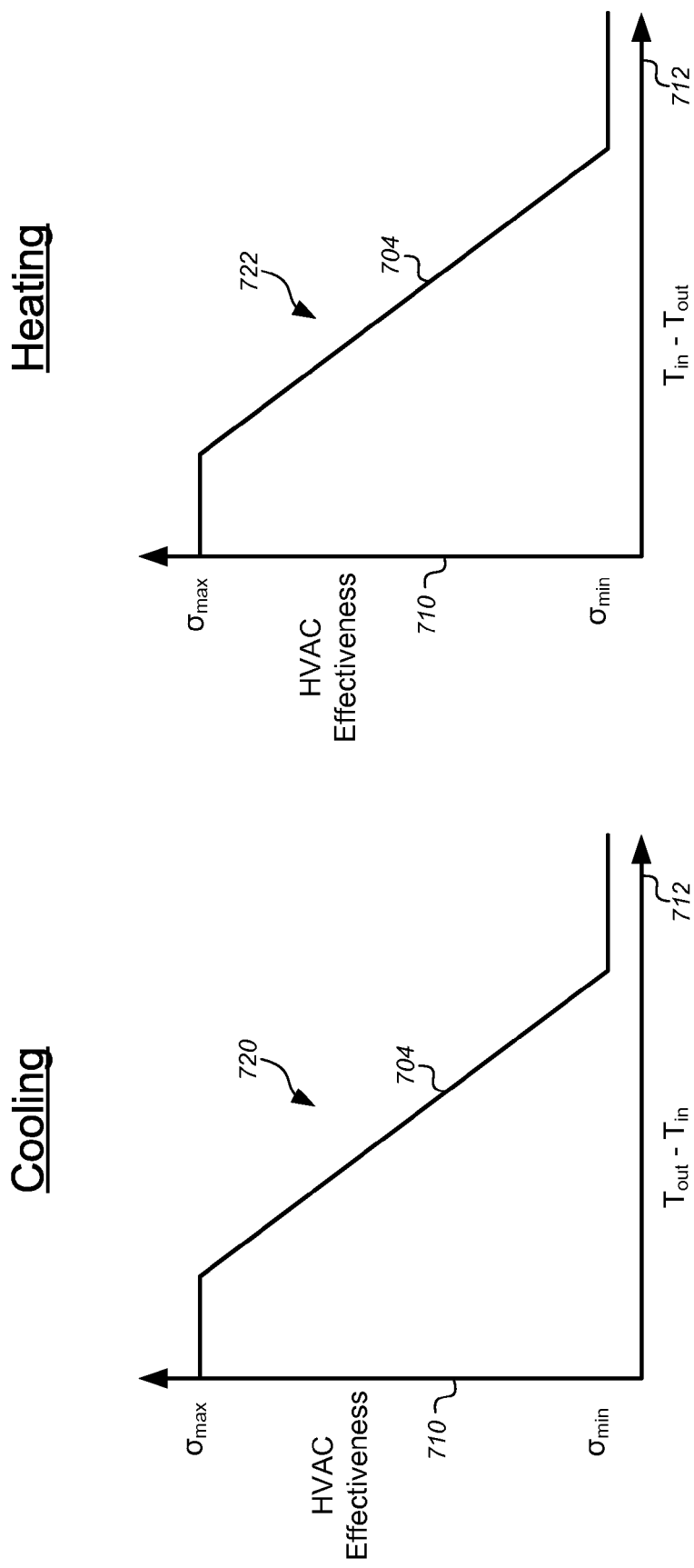
FIG. 7 illustrates graphs of HVAC effectiveness in relation to the differential between $T_{out}$ and $T_{in}$.

FIG. 7 shows graphs 720, 722 illustrating HVAC effectiveness relative to the difference between $T_{out}$ and $T_{in}$ where $T_{out}$ is the temperature outside of the enclosure and $T_{in}$ is the temperature inside of the enclosure. The vertical axis 710 in each graph represents HVAC effectiveness, $\sigma$, whereas the horizontal axis 712 in each graph represents the difference between $T_{out}$ and $T_{in}$.

More specifically, graph 720 illustrates the assumed HVAC effectiveness during a cooling cycle; that is, when the thermostat is operating in a cooling mode. When an air conditioner is operative, it can generally be assumed that the outdoor temperature $T_{out}$ is higher than the indoor temperature $T_{in}$ during the HVAC cycle. As illustrated by graph 720, as the difference between $T_{out}$ and $T_{in}$ increases, the effectiveness of the HVAC system in controlling $T_{in}$ is generally presumed to decrease. Conversely, as the difference between $T_{out}$ and $T_{in}$ decreases, the effectiveness of the HVAC system in controlling $T_{in}$ is generally presumed to increase. Some embodiments may model this relationship linearly as represented by section 704 of graph 720, which includes caps on the ranges of temperature differentials at which the maximum and minimum HVAC effectiveness is presumed. However, in other embodiments, those caps may be removed such that there are no 'flat' portions of the linear representation. In yet other embodiments, a non-linear (e.g., exponential) relationship may be presumed.

In contrast to the HVAC effectiveness during a cooling cycle that is described with respect to graph 720, graph 722 illustrates HVAC effectiveness during a heating cycle; that is, when the thermostat is operating in a heating mode. Note that the shape of the effectiveness curve is the same, but that the temperature differential is reversed such that it is determined by $T_{in}-T_{out}$, which reflects the assumption that the outdoor temperature will typically be lower than the indoor temperature during seasons where the HVAC heating functions are most often used.

Some embodiments, as previously mentioned with reference to 'caps' and as illustrated in FIG. 7, may augment this linear relationship between $T_{out}-T_{in}$ and HVAC effectiveness by imposing maximum and minimum limits on the HVAC effectiveness. In these embodiments, the basis function can include an estimate where the HVAC system is considered to operate at its maximum effectiveness over a certain range of indoor/outdoor temperature differentials, such as less than 1° C., less than 2° C., less than 3° C., less than a temperature differential in a range from 0° C. to 3° C., or greater than 3° C. Such a maximum effectiveness may be represented as $\sigma_{max}$. Similarly, the basis function can include an estimate where the HVAC system is considered to operate at its minimum effectiveness over a certain range of indoor/outdoor temperature differentials, such as greater than 15° C., greater than 17° C., greater than 20° C., greater than a temperature differential in a range from 15° C. to 20° C., or less than 15° C. or greater than 20° C. Such a minimum effectiveness may be represented as $\sigma_{min}$. In some embodiments, these minimum/maximum boundaries can be applied to increase the robustness of the thermodynamic model in extreme conditions. For example, while in a cooling cycle, when $T_{out}-T_{in}<0$, the effectiveness factor can be limited to $\sigma_{max}$, and when $\sigma_{max}-(T_{out}-T_{in})<0$, the effectiveness factor can be limited to $\sigma_{min}$. Similarly, while in a heating cycle, when $T_{in}-T_{out}<0$, the effectiveness factor can be limited to $\sigma_{max}$, and when $\sigma_{max}-(T_{in}-T_{out})<0$, the effectiveness factor can be limited to $\sigma_{min}$.

In some embodiments, $\sigma_{max}$ and/or $\sigma_{min}$ can be predetermined or empirically determined for a structure or a group of structures. For example, in at least one embodiment, $\sigma_{min}=0.0$ or some other nominal value (e.g., 0.01, 0.1, 0.2, a value in a range from 0.01 to 0.2, a value less than 0.01, or a value greater than 0.2) may be used as an approximation of the minimum effectiveness factor. Additionally or alternatively, samples of $T_{out}-T_{in}$ can be recorded during a training interval to identify the actual highest/lowest effectiveness factors seen by the thermostat. The average, mean, mode, and/or other statistical characterizations of the samples of $T_{out}-T_{in}$ can also be used. For example, some embodiments may estimate $\sigma_{max}$ as $$\sigma_{max}=k\cdot(T_{out}-T_{in})_{max\ training} \qquad (3)$$

where $(T_{out}-T_{in})_{max\ training}$ represents the maximum temperature differential observed during a training interval, and k represents a constant, such as k=1.8. Notably, k may have a different value, such as 2, 3, 4, 5, 8, 10, a value in a range from 1.8 to 10, a value less than 1.8, or a value greater than 10.

Regardless of the specific values for $\sigma_{min}$ and $\sigma_{max}$, for a cooling cycle, the behavior of the HVAC effectiveness factor illustrated in graph 720 may be mathematically represented as:

$$\sigma=\max(\sigma_{max}-\max(T_{out}-T_{in},0),\sigma_{min}) \qquad (4)$$

Similarly, for a heating cycle, the behavior of the HVAC effectiveness factor illustrated in graph 722 may be mathematically represented as:

$$\sigma=\max(\sigma_{max}-\max(T_{in}-T_{out},0),\sigma_{min}) \qquad (5)$$

A generalized basis function for the steady-state activity of the current HVAC cycle can be represented by combining the decaying function of equation (2) with the effectiveness factor of equations (4) or (5) to yield $$w_2 \cdot \text{efficiency} \cdot \left(\frac{1}{t_{cycle}}\right)^p \quad (6)$$

where $w_2$ represents a weight for this basis function. From equation (6), it will be recognized that as the indoor/outdoor temperature differential decreases, the effectiveness of the HVAC system increases, and as a result the basis function defined by equation (6) plays a larger role in predicting a change in indoor temperature in response to a given HVAC actuation state.

At this point, a weighted basis function representing the early-state activity has been derived in equation (1), and a weighted basis function representing the steady-state activity has been derived in equation (6). A question that remains is when to transition between equation (1) and equation (6) when evaluating their contributions in a thermodynamic model. Some embodiments may evaluate both basis functions as continuous functions by adding the results together in the thermodynamic model. Examples of this type of evaluation are further described in commonly assigned U.S. Ser. No. 13/866,602 (Ref. No. NES0339-US), filed Apr. 19, 2013, titled "Generating and Implementing Thermodynamic Models of a Structure," the entire contents of which are incorporated herein in their entirety for all purposes. However, some embodiments may alternatively or additionally use a piecewise evaluation of basis functions to represent the transition between the early-state activity and the steady-state activity of the current HVAC cycle. The time at which this transition between the early-state activity and the steady-state activity takes place may be represented by $\tau_{response}$, which may represent the end of a response interval of the structure to the HVAC system.

Figure 8:
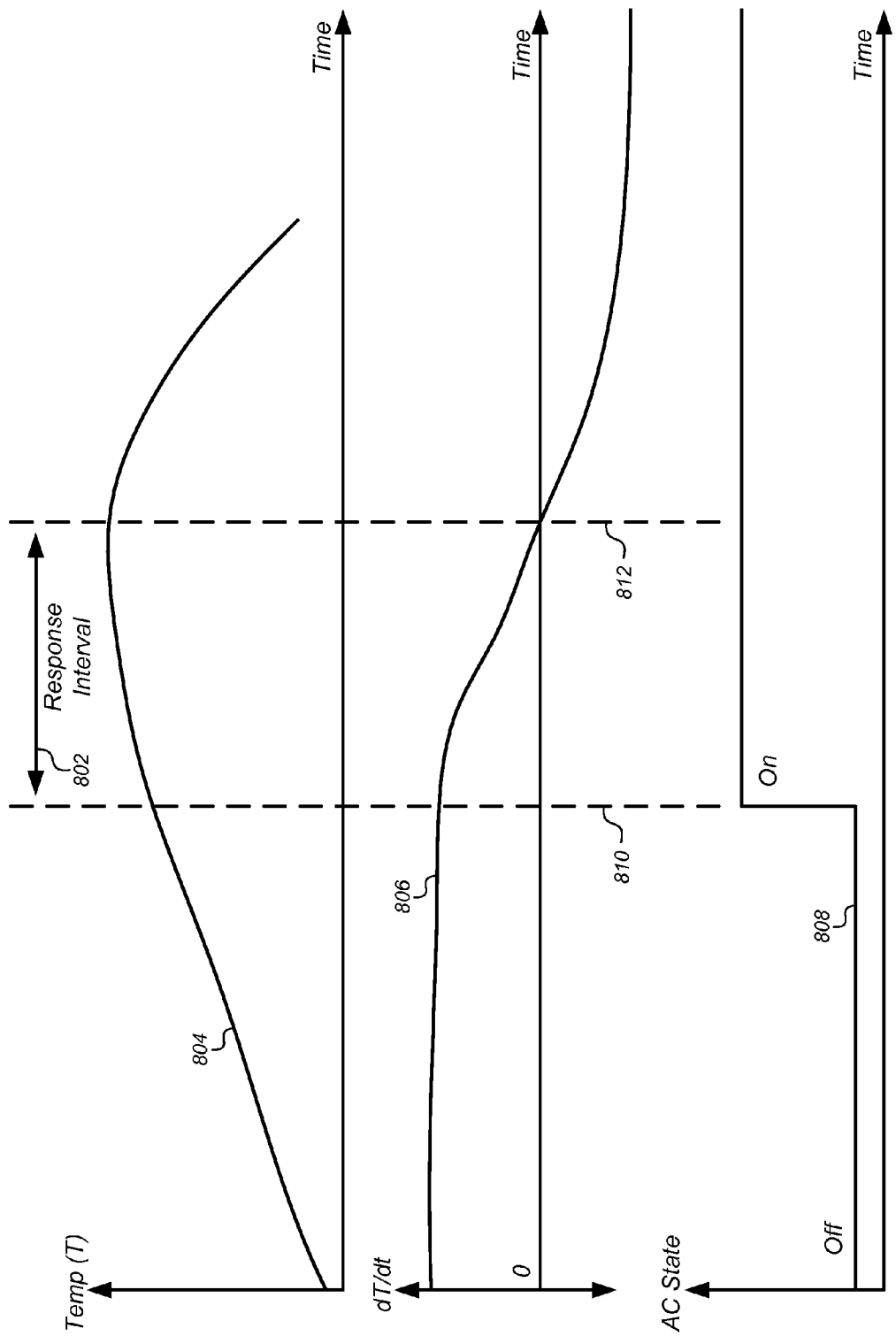
FIG. 8 illustrates a graph of an HVAC response interval, according to some embodiments.

FIG. 8 illustrates a graph of an HVAC response interval correlated with a change in HVAC state, a rate of change of indoor temperature over time, and a change of indoor temperature over time, according to some embodiments. Curve 808 represents the HVAC state as a function of time. Prior to time 810, the air-conditioning function of the HVAC state is off. After time 810, the air-conditioning function of the HVAC state is on. Note that the air-conditioning function is merely exemplary, and any HVAC state may operate in a similar or more complex manner. On the same time axis, curve 804 represents the indoor temperature ($T_{in}$) of the structure. On a day when ($T_{out}-T_{in}$)>0, the temperature inside the enclosure will tend to drift upwards when the air conditioner is off. Thus, curve 804 is drifting upwards prior to time 810. At time 810 when the air conditioner turns on, curve 804 will continue to drift upwards, albeit at a slower rate as the air conditioner ramps up. This slower upward drift represents the early-state activity, when the activity of the previous HVAC cycle (i.e., upward temperature drift in the absence of HVAC actuation) will contribute primarily to the change in temperature of the indoor temperature.

Eventually, the effect of the air conditioner will cause the indoor temperature to stop drifting upwards and instead begin to fall. At time 812, the effect of the current HVAC cycle (the air-conditioning function) will begin to dominate and replace the effect of the previous HVAC cycle. Curve 806 illustrates the rate of temperature change in the enclosure according to the same timescale. For exemplary purposes, the temperature increase prior to time 810 is linear and the rate is constant. After time 810, the rate begins to fall but remains positive. At time 810, curve 806 crosses the 0.0 axis, and the rate becomes negative as the temperature begins to fall.

The interval between time 810 and time 812 may be referred to herein as a response interval 802. Time 812 may be referred to as dead time or response time, identified herein as $\tau_{response}$. As may be apparent from this example, the response time may be defined as the time it takes for the temperature derivative to cross zero. In some embodiments, the response time can be programmed as a predetermined value. In some embodiments, the response time can be determined empirically for a single structure or for group of structures. For example, for a given structure, the response time can be calculated by averaging a set of observed response times during a training interval, possibly following the installation of the thermostat in the structure.

To combine the basis function of equation (1) and the basis function of (2), the response time can be used to separate the evaluation of these two piecewise-continuous functions. In some embodiments, the combination of these two basis functions can be represented by $$w_1 \cdot \frac{dT}{\frac{dt_{previous\ cycle}}{t_{cycle}}}\bigg]_{t=0}^{t=\tau_{response}} + w_2 \cdot \text{efficiency} \cdot \left(\frac{1}{t_{cycle}}\right)^p \bigg]_{t=\tau_{response}}^{t=\infty} \quad (7)$$

In addition to the combination of the two basis functions in equation (7), additional basis functions may also be included to model the effect of other thermodynamic characteristics. For example, the effect of sunlight on indoor temperature may also be significant in many installations. This can be accounted for using a time of day. In some embodiments, the time of day may be represented by a periodic diurnal function, such as $$w_3 \cdot \sin(2\pi \cdot \text{mod}(t,1)) \quad (8)$$

where t represents the local time of day and $w_3$ represents a weight for this basis function.

Additionally, the differential between $T_{out}$ and $T_{in}$ may also effect the temperature change in the structure when the HVAC system is not heating or cooling the structure (i.e., the HVAC system is in a "drift" state). When the HVAC function is actuated, this differential may be effectively accounted for by the effectiveness term introduced in equations (4) and (5). When the HVAC system is actively heating/cooling, the order of magnitude of the heat transfer due to the differential between $T_{out}$ and $T_{in}$ is much less than the effect of the HVAC system. However, when the HVAC system is not actively heating/cooling, the differential between $T_{out}$ and $T_{in}$ is much more significant in relative terms. Therefore, the thermodynamic model may include a basis function representing temperature drift when the HVAC system is not actively heating/cooling. Some embodiments may represent temperature drift simply by $$w_4 \cdot (T_{out}-T_{in}) \quad (9)$$

where $w_4$ represents a weight for this basis function.

It will be understood that some or all of these basis functions may be combined in a variety of ways in forming the thermodynamic model. Further, additional or alternative basis functions could be used. In many embodiments, each basis function is weighted, where a specific weighting could be dynamically determined by, e.g., a fitting algorithm (discussed Later). By way of example, some embodiments may use combinations of the basis functions and weights of equations (1), (6), (8), and (9) to generate thermodynamic models for one or more of the HVAC states. The thermodynamic models may be functions of various inputs described above, such as $$\Delta T = f(\tau_{response}, t_{cycle}, T_{out}, T_{in}, dT/dt_{previous\ cycle}, t, U) \quad (10)$$

where $\Delta T = T_{n+1} - T_n$, $T_n$ represents the indoor temperature at a current timestep, and $T_{n+1}$ represents the indoor temperature at a subsequent time step.

The general function of equation (9) may be implemented by some embodiments as a thermodynamic model of an active HVAC heating/cooling state by combining equations (1), (6), and (8) above as follows:

$$w_1 \cdot \frac{\frac{dT}{dt_{previous\ cycle}}}{t_{cycle}}\Bigg|_{t=0}^{t=\tau_{response}} + w_2 \cdot \text{efficiency} \cdot \left(\frac{1}{t_{cycle}}\right)^p \Bigg|_{t=\tau_{response}}^{t=\infty} + \quad (11)$$

$$w_3 \cdot \sin(2\pi \cdot \text{mod}(t, 1))$$

For modeling the drift state in absence of active HVAC heating/cooling, the $w_4 \cdot (T_{out} - T_{in})$ weight and basis function of equation (9) may be added to the weights and basis functions of equation (11), and the effectiveness factor may be assumed to be equal to 1, resulting in $$w_1 \cdot \frac{\frac{dT}{dt_{previous\ cycle}}}{t_{cycle}}\Bigg|_{t=0}^{t=\tau_{response}} + w_2 \cdot \left(\frac{1}{t_{cycle}}\right)^p \Bigg|_{t=\tau_{response}}^{t=\infty} + \quad (12)$$

$$w_3 \cdot \sin(2\pi \cdot \text{mod}(t, 1)) + w_4 \cdot (T_{out} - T_{in})$$

It will be understood that some or all of these basis functions may be combined in a variety of ways in forming the thermodynamic model. Further, additional or alternative basis functions could be used. In many embodiments, each basis function is weighted, where a specific weighting could be dynamically determined by, e.g., a fitting algorithm (discussed later).

Turning back briefly to FIG. 6, the thermodynamic behavior prediction element 620 may acquire a variety of information prior to simulating the thermodynamic behavior of the structure. For example, thermodynamic behavior prediction element 620 may acquire values for the weighting factors $w_1$, $w_2$, $w_3$, and/or $w_4$, from the thermodynamic model generator 630, an expected outdoor temperature $T_{out}^i$ over the prediction time period from a remote entity, and values for the constants p and k. As the thermodynamic behavior prediction element 620 progresses through the time-wise sequence of input desired environmental conditions, the predicted indoor temperature at a given time during the prediction period may be used as an input, such as n, for predicting the thermodynamic behavior at a subsequent time in the prediction.

System 600 in certain embodiments implements thermodynamic behavioral modeling and includes a variety of components such as an HVAC control element 610, a thermodynamic behavior prediction element 620, and a thermodynamic model generator 630, according to various embodiments. However, it will be appreciated by those skilled in the art that systems that perform the various operations described herein could operate equally well with fewer or a greater number of components than are illustrated in FIG. 6. Thus, the depiction of system 600 in FIG. 6 should be taken as being illustrative in nature, and not limiting to the scope of the present teachings.

Figure 9:
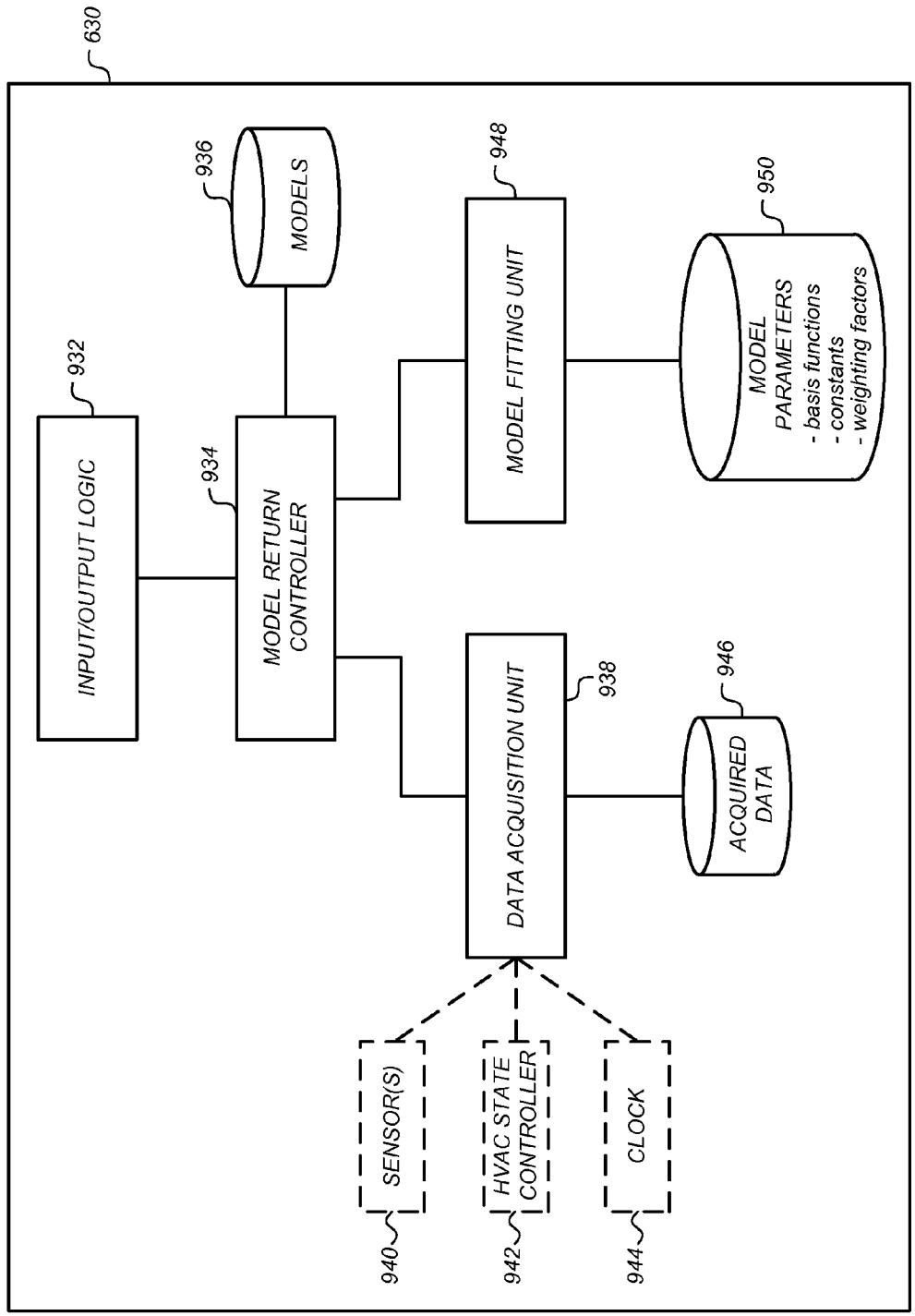
FIG. 9 illustrates a thermodynamic model generator according to an embodiment.

FIG. 9 illustrates a thermodynamic model generator 630 according to an embodiment. The thermodynamic model generator 630 operates to identify and/or, in some cases generate, a thermodynamic model that characterizes an environmental characteristic trajectory of a structure in response to application of an HVAC actuation state. Thermodynamic model generator 630 includes a variety of components, such as input/output logic 932, a model return controller 934, a model storage element 936, and a data acquisition unit 938 coupled to sensor(s) 940, an HVAC state controller 942, and a clock 944. The thermodynamic model generator 630 may further include a data storage element 946, a model fitting unit 948, and a model parameter storage element 950. Each of these components may be physically, logically, or communicatively coupled to one another, and in some embodiments the structural elements and/or functionality thereof described herein for one or more components of model generator 630 may similarly be implemented in other components of model generator 630. Moreover, the components of model generator 930 can be implemented in hardware, software, or any combination thereof, and while in one embodiment the components of model generator 630 may be implemented in device 400, other embodiments are not so limited as either some or all of the components may be implemented in electronic devices (e.g., devices associated with smart home environment 100 such as portable electronic device 166 and/or remote server 164) other than device 400.

Thermodynamic model generator 630 may be operable to identify and/or generate a model in response to a request for a thermodynamic model. Once a model has been identified or otherwise generated, thermodynamic model generator 630 may return the model and/or components thereof. For example, in response to a request for a model communicated from thermodynamic behavior prediction element 620, model generator 630 may identify a thermal model and communicate the thermal model to the prediction element 620, where the communicated model may include one or more model parameters that characterize the model, such as values for the weighting factors $w_1$, $w_2$, $w_3$, and/or $w_4$. In some embodiments, one or more models may have already been generated at the time the request is received, and in some situations (e.g., if those models are still valid, i.e., generated based on data that was acquired relatively recently with respect to the time of receiving the request, such as within 24 hours) a model that has already been generated may be returned. In some embodiments, the request may indicate a level of specificity desired for a model. For example, a model may have been generated based on data created when both a stage one and a stage two heater were actuated. The request may indicate that it requires a model that was generated based on data created when both a stage one and stage two heater were actuated, but also a fan was actuated. In response to the request, the model generator 630 may search for candidate models that have already been generated and may satisfy the requested level of specificity. If no candidate models are found, then a new model may be generated and returned. If one candidate is found, then that model may be returned. If multiple candidates are found, then the most restrictive model may be returned. In this particular example, the existing model may not be sufficiently specific to satisfy the request, in which case a new model may be generated that is tailored to the request.

Input/output logic 932 includes logic operable to communicatively interface components of the thermodynamic model generator 630 with other components, such as thermodynamic behavior prediction element 620. Input/output logic 932 may thus be operable to receive, interpret, formulate and communicate responses to requests for thermal models.

Model return controller 934 may be operable to perform a variety of operations, including analyzing a request for a model, searching for existing models, identifying a specific model to return in response to the request, instructing the data acquisition unit 938 to acquire data to generate a new model, and instructing the model fitting unit 948 to fit weighting factors for a new model. Model return controller 934 may be coupled to the input/output logic 932, model storage element 936, data acquisition unit 938, and model fitting unit 948.

Model storage element 936 may store one or more thermodynamic models, including parameters thereof. For example, model storage element 936 may include information indicative of the basis functions used in a particular model, the value of any constants used in the model, and the value of any weighting factors used in the model. For each model, model storage element 936 may also include information indicative of the specificity level of the model, where the specificity level may indicate the type of data that was used to generate the model. For example, the specificity level may indicate the type of stages that were active for the data that was used to generate the model.

Data acquisition unit 938 may be operable to acquire a variety of data for use in generating a thermodynamic model. For example, data acquisition unit 938 may be coupled to one or more sensors 940 for receiving sensed information such as indoor temperature, outdoor temperature, indoor humidity, outdoor humidity, occupancy, etc. Data acquisition unit 938 may also be coupled to an HVAC state controller 942 which indicates the HVAC actuation state over time (e.g., whether stage one heating is on, stage two heating is on, emergency heating is on, etc.). Data acquisition unit 938 may also be coupled to a clock 944 which may provide timing signals for correlating the information received by the sensor(s) 640 and HVAC state controller 942. A variety of types of information that may be used in thermodynamic model generation are further described in commonly assigned U.S. Ser. No. 12/881,430 (Ref. No. NES002-US), filed Sep. 14, 2010, the entire contents of which are incorporated herein by their entirety for all purposes. Data acquisition unit 938 may also be coupled to a data storage element 946 which may be operable to store the data acquired by the data acquisition unit 938.

Model fitting unit 948 may be operable to fit the basis function weighting factors associated with a set of basis functions to some or all of the acquired data. These weighting factors may be fit using one or more of a variety of fitting techniques, including but not limited to least-squares fitting. The weighting factors may be fit using any suitable history of data, including 1 day, 3 days, 5 days, 7 days, 10 days, 14 days, a number of days in a range of 1 to 14, or a number of days less than 1 or greater than 14. In fitting the weighting factors, model fitting unit 948 may first identify one or more basis functions for which representations are stored in the model parameter storage element 950. For example, model fitting unit 948 may identify and select one or more of the previous described basis functions. Once the basis functions used to construct the model are selected, any suitable constants that may be associated with those basis functions, such as one or more of the previously described constants, may be identified and their values determined. Model fitting unit 948 may then determine the appropriate historical data stored in acquired data element 946 to use (where the appropriate data may be defined by the model request) and fit the weighting factors to that historical data so that the weighted basis functions characterize the historical thermodynamic response of the structure and can thus be subsequently used for predicting the future thermodynamic response of the structure. In some embodiments, model fitting unit 648 uses data generated only during a certain time period, such as from local midnight to local midnight. In such a case, the frequency of generating models may be reduced as models created based on the same criteria but within the same 24 hour period may be identical to one another.

Thermodynamic model generator 630 operates to identify and/or, in some cases generate, a thermodynamic model, and includes a variety of components such as input/output logic 932, a model return controller 934, a model storage element 936, a data acquisition unit 938, a data storage element 946, a model fitting unit 948, and a model parameter storage element 950. However, it will be appreciated by those skilled in the art that systems that perform the various operations described herein could operate equally well with fewer or a greater number of components than are illustrated in FIG. 9. Thus, the depiction of thermodynamic model generator 630 in FIG. 9 should be taken as being illustrative in nature, and not limiting to the scope of the present teachings.

Figure 10:
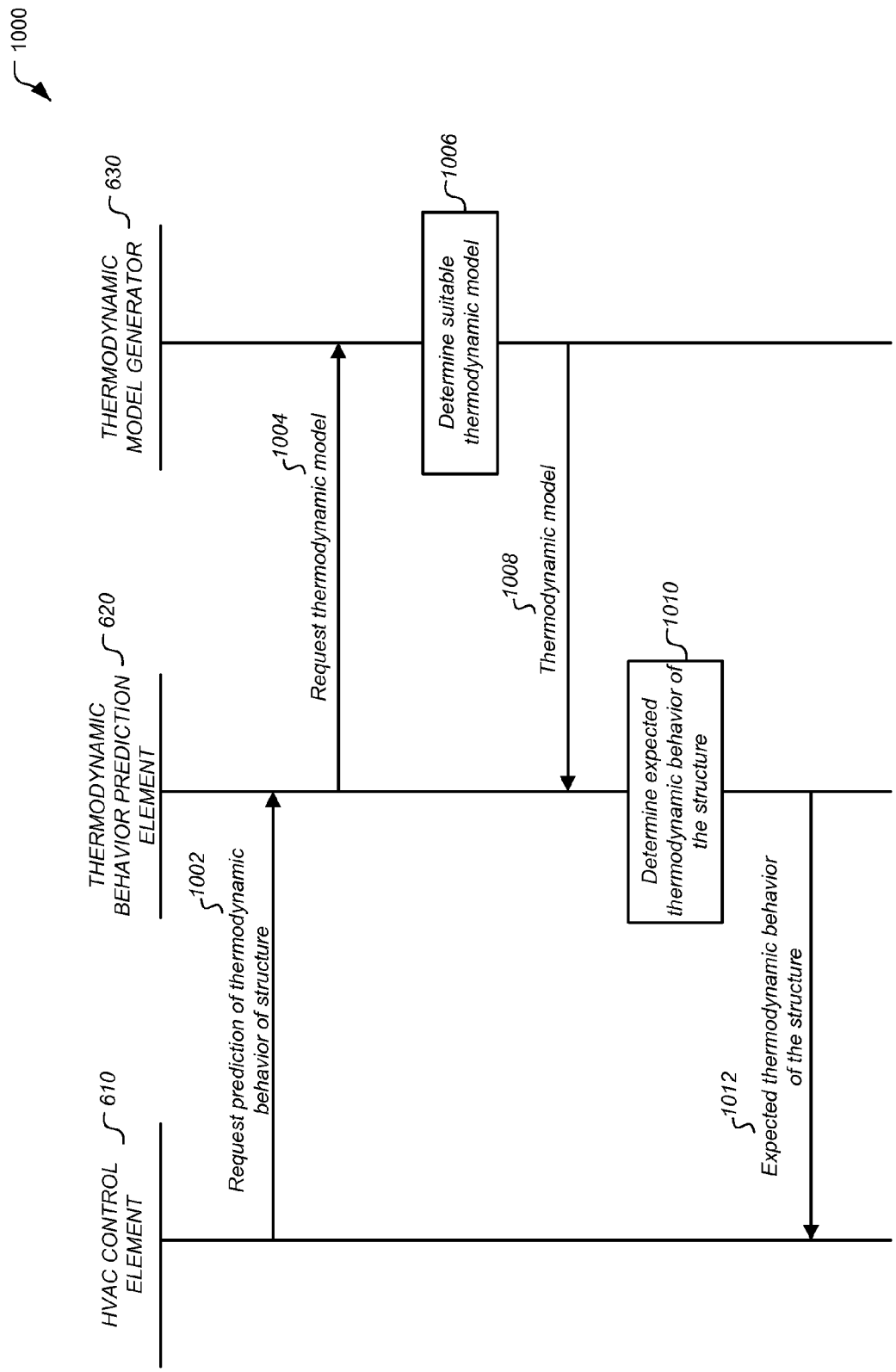
FIG. 10 illustrates a communication sequence of a process for determining an expected environmental response of a structure to possible changes in the actuation state of an associated HVAC system according to an embodiment.

FIG. 10 illustrates a communication sequence of a process 1000 for determining an expected environmental response of a structure to possible changes in the actuation state of an associated HVAC system according to an embodiment. To facilitate understanding, the process 1000 is described with reference to FIG. 6-9, although it should be understood that embodiments of the process 1000 are not limited to the exemplary systems and apparatus described with reference to FIGS. 6-9.

In operation 1002, HVAC control element 610 communicates a request for a prediction of the thermodynamic behavior of a structure to the thermodynamic behavior prediction element 620. In some specific embodiments, the request may include a request for an expected indoor temperature profile, an expected indoor humidity profile, or a profile characterizing one or more other expected indoor environmental characteristics. The request may include some, none, or all of a variety of information in support of the request. For example, the request may include a desired HVAC control trajectory that characterizes the desired control of the HVAC system over the prediction time period, such as a schedule of setpoint temperatures for the prediction time period.

In response to receiving the request, in operation 1004 thermodynamic behavior prediction element 620 may request a suitable thermodynamic model from the thermodynamic model generator 630. In some embodiments, the request may indicate a level of specificity desired for a model, such as an indication of the actuation state of one or more stages of the HVAC system for which the model is to be suited for. In other embodiments, the request may also or alternatively indicate the basis functions which should be used to generate the model. For example, in some embodiments the number or selection of basis functions used by the thermodynamic behavior prediction element 620 may change, and/or the thermodynamic model generator 630 may store a number of different models where different basis functions are used in the different models. Accordingly, the request may indicate which specific basis functions are being implemented by the thermodynamic behavior prediction element 620 at a given time, and thus the specific basis functions by which a model should be generated.

In response to receiving a request for a thermodynamic model, in operation 1006 thermodynamic model generator 630 may determine a suitable thermodynamic model that satisfies the request. This may include searching pre-existing models for a model that is most suitable, and/or generating a new model that is catered to the request.

Once a suitable model has been identified, in operation 1008 the model may be returned to the thermodynamic behavior prediction element 620. In returning the model, a variety of information may be communicated, such as information indicative of the value of any basis function weighting factors, the value of any constants used in conjunction with the basis function, and in some cases an identification of the basis functions used by the model.

In response to receiving the model, thermodynamic behavior prediction element 620 may determine the expected thermodynamic behavior of the structure based on the model and a desired HVAC control trajectory, such as a schedule of setpoint temperatures for the prediction time period. Once the expected thermodynamic behavior of the structure is determined, in operation 1012 it may be returned to the HVAC control element 610. This may include, for example, returning one or more of an expected indoor temperature profile, an expected indoor humidity profile, an expected HVAC actuation trajectory, or the like.

It should be appreciated that the specific operations illustrated in FIG. 10 provide a particular process for determining an expected environmental response of a structure to possible changes in the actuation state of an associated HVAC system according to various embodiments. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 11:
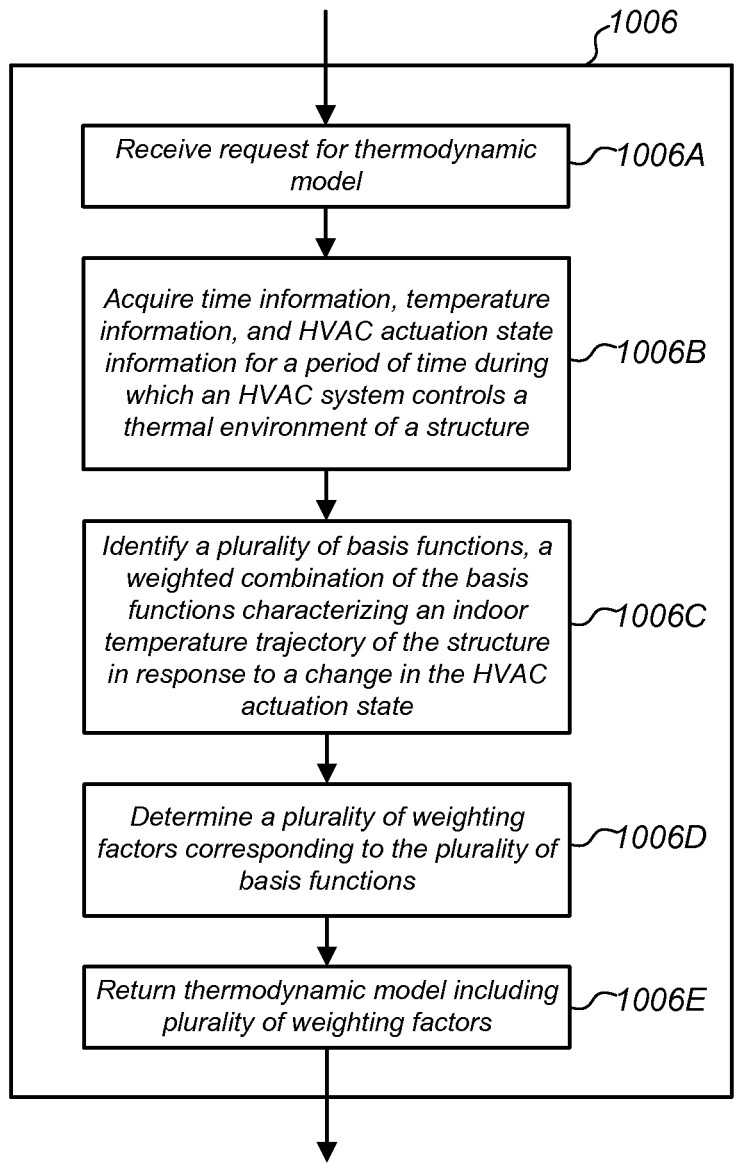
FIG. 11 illustrates a process for determining a suitable thermodynamic model according to an embodiment.

FIG. 11 illustrates a process for determining a suitable thermodynamic model according to an embodiment. To facilitate understanding, the process is described with reference to FIGS. 6-10, although it should be understood that embodiments of the process are not limited to the exemplary systems and apparatus described with reference to FIGS. 6-10. In some embodiments and as described herein, the process may be implemented as operation 1006. However, it should be recognized that embodiments are not so limited, as the process(es) described herein could be implemented in operations other than operation 1006.

In operation 1006A, a request for a thermodynamic model is received. For example, thermodynamic model generator 630 may receive a request for a thermodynamic model communicated from thermodynamic behavior prediction element 620.

In operation 1006B, time information, temperature information, and HVAC actuation state information is acquired for a period of time during which an HVAC system controls an environmental characteristic (e.g., a thermal environment) of a structure. For example, data acquisition unit 638 may acquire time information such as the time of day in local time, the elapsed time since the beginning of a current cycle, the estimated time in a cycle that steady-state activity begins to overcome early-cycle activity, and the like, where some or all of such data may be acquired from an internal or external clock 644. Data acquisition unit 638 may acquire temperature information such as the indoor temperature, outdoor temperature, structure temperature, and the like, where some or all of such data may be acquired from one or more sensors 640. Data acquisition unit 638 may also or alternatively acquire HVAC actuation state information, which may indicate which stage or stages or the HVAC system were actuated during the period of time during which the HVAC system controlled the thermal environment of the structure from, e.g., HVAC state controller 642.

In operation 1006C, a plurality of basis functions are identified, where a weighted combination of those basis functions characterize an indoor temperature trajectory of the structure in response to a change in the HVAC actuation state. For example, basis functions indicating the initial rate from a previous cycle, the primary effect from a given stage, the effect of the difference between outdoor temperature and indoor temperature, the effect of the difference between structure temperature and indoor temperature, the effect of the time of day, and a constant representing energy changes not affected by environmental factors may be identified.

In operation 1006D, a plurality of weighting factors corresponding to the basis functions may be determined. For example, weighting factors such as the previously described $w_1$, $w_2$, $w_3$, and/or $w_4$ may be determined by fitting them to the acquired data.

In operation 1006E, a thermodynamic model including the weighting factors is returned. For example, information indicative of the value of the weighting factors $w_1$, $w_2$, $w_3$, and/or $w_4$ may be communicated from the thermodynamic model generator 630 to the thermodynamic behavior prediction element 620.

It should be appreciated that the specific operations illustrated in FIG. 11 provide a particular process for determining a suitable thermodynamic model according to an embodiment. Other sequences of operations may also be performed according to alternative embodiments. For example, alternative embodiments of the present invention may perform the operations outlined above in a different order. Moreover, the individual operations illustrated in FIG. 11 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

As described with reference to FIG. 9, a number of models may be stored in model storage element 936 for use by the thermodynamic behavior prediction element 620 of FIG. 6. In many embodiments, the first time a model is needed on a particular (e.g., local) day, the model may trained (i.e., generated) and the parameters thereof stored in a model cache such as model storage element 936. While the models may subsequently be used to satisfy subsequent requests, in some embodiments the models stored in model storage element 936 may become stale after a certain period of time, such as after 24 hours. In some cases, the time period during which a stored model is valid may be correlated with the time period of data used to generate the models. Once a model becomes stale, even if the model may be suitable to satisfy a model request, the model may not be returned but rather a new model may be generated.

As also previous described, an HVAC system may include a number of stages, such as a fan, stage one heat, stage two heat, etc. A request for a thermodynamic model may indicate a desired level of specificity. If a model exists that satisfies the requested criteria, such a model may be returned. Otherwise, a new model specifically tailored to the requested criteria may be generated and returned.

For example, in some embodiments, an HVAC actuation state may be defined by binary settings of the stages, where each stage may have a binary ON state or a binary OFF state. Table 1 illustrates an example sequence of HVAC states.

TABLE 1

Example sequence of HVAC states

| Stage | 12:00 am | 7:35 am | 7:43 am | 7:50 am | 7:55 am | 8:10 am | 9:30 am | 9:50 am |
|---|---|---|---|---|---|---|---|---|
| Fan | off | ON | off | ON | ON | off | ON | off |
| StageOneHeat | off | ON | off | ON | ON | off | ON | off |
| StageTwoHeat | off | off | off | off | ON | off | ON | off |
| EmergencyHeat | off | off | off | off | off | off | off | off |

In making a request for a model, thermodynamic behavior prediction element 620 may make a request such as "Give me a model for the structure which is valid when StageOneHeat is on." A problem with such a request, however, is that there is no data measured when only StageOneHeat is on because the Fan is also always on at the same time. Of course, the thermodynamic behavior prediction element 620 probably doesn't care if the fan is on. So the request should really be more specific, such as "Give me a model for the structure which is valid when StageOneHeat is on and I don't care about the other stages." A problem with this request, however, is that as indicated in Table 1, some of the data when StageOneHeat is on was collected while StageTwoHeat was also on, and the StageTwoHeat data probably distorts the model. Accordingly, when requesting a model, thermodynamic behavior prediction element 620 should specify which switches it cares about in addition to the specific settings of those switches. For example, thermodynamic behavior prediction element 620 may make a request such as "Give me a model for the structure which is valid when StageOneHeat is on and StageTwoHeat is off and EmergencyHeat is off and I don't care about the settings of any other stages." In view of these complexities, when making a request for a model, thermodynamic behavior prediction element 620 may specify the set of stages that it cares about in the form of a mask.

After the most specific example request above, there will be model in the model storage element 636 that was generated from:

mask: Fan—don't care; StageOneHeat—care; StageTwoHeat—care; EmergencyHeat—care actuation state: Fan—N/A; StageOneHeat—On; StageTwoHeat—Off; EmergencyHeat—Off Any subsequent request for "Give me a model for the structure which is valid when StageOneHeat is on and StageTwoHeat is off and EmergencyHeat is off and I don't care about the settings of any other stages" will get this same model and be able to reuse it.

A couple of challenges arise with this fairly strict model-matching policy. First, any request for "Give me a model for the structure which is valid when StageOneHeat is on and I care about all the other switches and they must be off" will not be able to use the aforementioned model because it was trained on some data which was taken when the fan was on. A new model would have to be fit against the smaller subset of data. Second, any request for "Give me a model for the structure which is valid when StageOneHeat is on and I don't care about the settings of any other switches" will also not be able to reuse this model because the model did not use the data when StageTwoHeat was on. Thus, the model was not trained on all of the available data and a new model would have to be fit against a larger set of data.

In some embodiments, a model's definition may be expanded during fitting. Using the example above, a request for "Give me a model for the structure which is valid when StageOneHeat is on and StageTwoHeat is off but I don't care about Fan or EmergencyHeat" will not be able to reuse the same model because the model was trained on data for which EmergencyHeat was off. In this request for a model, the thermodynamic behavior prediction element 620 doesn't care about the EmergencyHeat setting and so the prefit model isn't general enough. However, as we can see from the data, when the model was fit for EmergencyHeat off, the model fitting unit 948 could have noticed that there was no data when the EmergencyHeat was on. So, a request which said "I don't care about EmergencyHeat" would have got exactly the same results as the more restrictive request for a model "when EmergencyHeat is off". Thus, the model fitting unit 948 can change the request on the fly from "EmergencyHeat must be off" to "I don't care about EmergencyHeat" without changing the model parameters. Now the more general model can be reused for the 2nd request, above. Of course, every time new data is collected and the model is refit, the same validation may be made again to ensure there isn't any data with EmergencyHeat on creeping into the model used by the thermodynamic behavior prediction element 620 for the instance it specified it only wants data when EmergencyHeat is off.

In some embodiments, a model's definition may be restricted during fitting. Similar to the above example, assume a request had been made for a model "when StageOneHeat is on and I don't care about Humidification." During fitting, the model fitting unit 648 may notice that although the request didn't care about humidification, in fact, humidification was always off. If the fitting algorithm makes note of that fact in the model, then a second subsequent request for "when StageOneHeat is on and Humidification must be off" could reuse the same model.

Thus, in some embodiments, a model may keep track of various bits independently for each HVAC stage as illustrates in Table 2.

TABLE 2

Bits used to identify model status.

| MaskEither | Both | On | Notes |
|---|---|---|---|
| 1 | 1 | N/A | The model was requested without regard to this switch state. During fitting, data from both values of this switch state were used: ON and OFF |
| 1 | 0 | 0 | The model was requested without regard to this switch state. During fitting, it was found that all the data available happen to have this switch set to OFF |
| 1 | 0 | 1 | The model was requested without regard to this switch state. During fitting, it was found that all the data available happen to have this switch set to ON |

TABLE 2-continued

Bits used to identify model status.

| MaskEither | Both | On | Notes |
|---|---|---|---|
| 0 | 0 | 0 | The model was trained using only data for which this switch was set to OFF by request. (it is unknown if data exists for when this switch was ON) |
| 0 | 0 | 1 | The model was trained using only data for which this switch was set to ON by request. (it is unknown if data exists for when this switch was OFF) |
| 0 | 1 | 0/1 | Not valid. |

In Table 2, the MaskEither bit is an input into the fitting algorithm, where the model request may specify this as the mask parameter.

The On bit, if MaskEither=0 (i.e., false), then indicates that the setting of the HVAC stage matters, and the On bit may be specified in the model request as an input into the fitting algorithm.

The Both bit is an output from the model fitting unit 648 after model fitting is complete, and may be set to reflect the data which was chosen to fit the model.

The On bit, if MaskEither=1 (i.e., true) and the Both bit=0 (i.e., all of the data was either On or Off), then this bit is also an output from the model fitting unit 648 to reflect the data which was chosen to fit the model.

Figure 12:
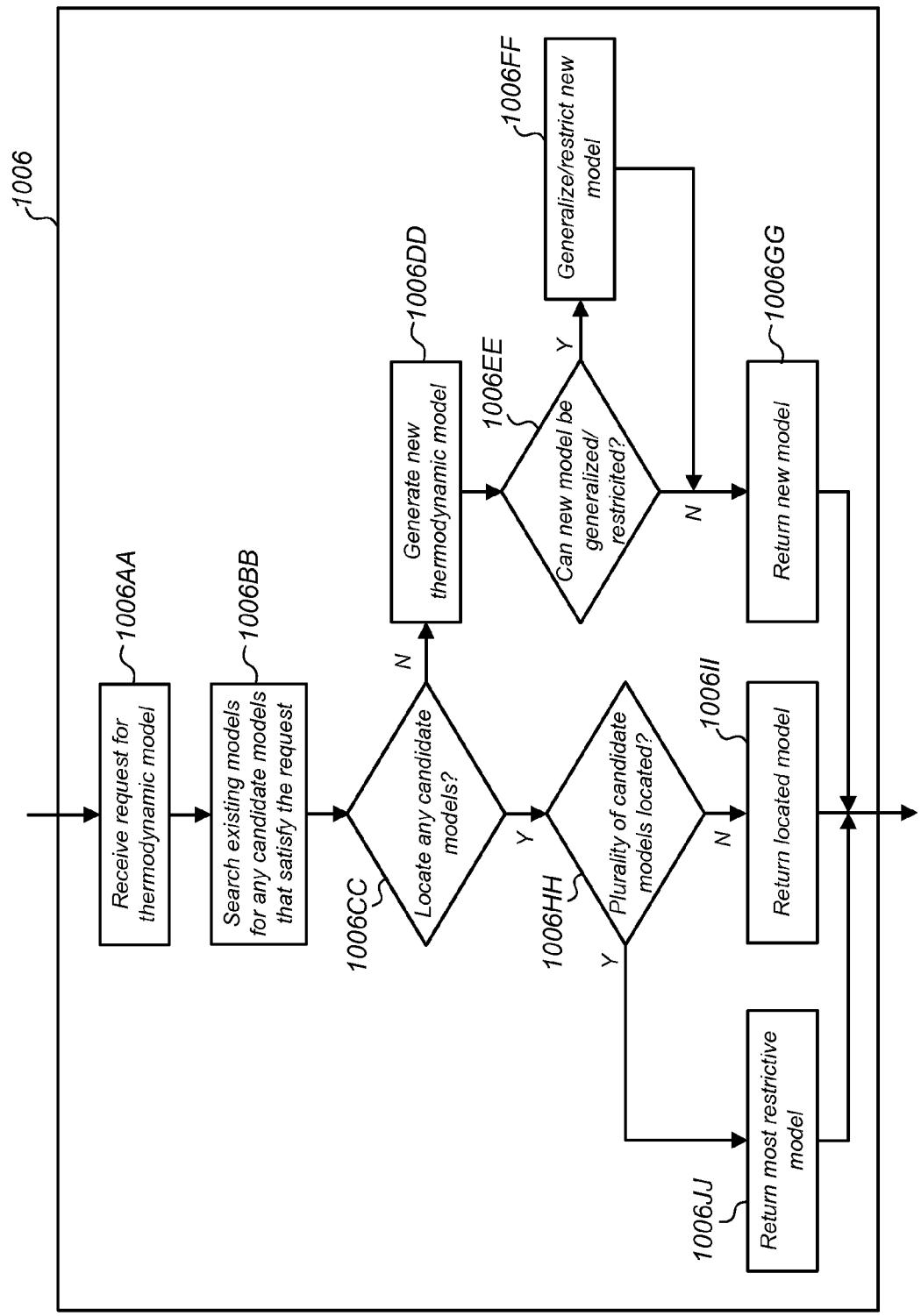
FIG. 12 illustrates a process for determining a suitable thermodynamic model according to another embodiment.

FIG. 12 illustrates a process for determining a suitable thermodynamic model according to another embodiment. To facilitate understanding, the process is described with reference to FIGS. 6-11, although it should be understood that embodiments of the process are not limited to the exemplary systems and apparatus described with reference to FIGS. 6-11. In some embodiments and as described herein, the process may be implemented as operation 1006. However, it should be recognized that embodiments are not so limited, as the process(es) described herein could be implemented in operations other than operation 1006.

In operation 1006AA, a request for a thermodynamic model is received. For example, thermodynamic model generator 630 may receive such a request from thermodynamic prediction element 620. The request may indicate a desired level of specificity for a returned model. For example, the request may include a mask indicating which HVAC stages it would like the model to be tailored to, and the actuation state of each of those stages.

In operation 1006BB, existing models are searched for any candidate models that satisfy the request. For example, model return controller 934 may search the model storage element 936 for one or more models that satisfy the request. Such models may satisfy the request if they have the desired level of specificity or an acceptable level of generality.

In operation 1006CC, it is determined whether any candidate models are located as a result of the search. If not, then processing may continue to operation 1006DD where a new thermodynamic model is generated. A new thermodynamic model may be generated, for example, by model fitting unit 948, as discussed with reference to operations 1006B through 1006D. Further, the new thermodynamic model may be generated based on the level of specificity indicated in the request.

Once a new model is generated, processing may continue to operation 1006EE where it is determined whether the new model may be generalized or restricted. The new model may be generalized, or expanded, if it is determined that the data used to generate the model having the requested level of specificity may also satisfy a model request indicating a less restrictive level of specificity. Similarly, the new model may be restricted, or narrowed, if it is determined that the data used to generate the model having the requested level of specificity may also satisfy a model request indicating a more restrictive level of specificity.

If the new model may be generalized or restricted, then processing may continue to operation 1006FF where the new model is generalized or restricted. In generalizing/restricting the new model, information indicating the different levels of specificity for which the model applies may be associated with the model and stored in model storage element 936.

Processing may then continue to operation 1006GG where the new model is returned. For example, in response to a request for a model communicated to thermodynamic model generator 630, thermodynamic model generator 630 may return the new model to thermodynamic behavior prediction element 620.

Returning to operation 1006CC, if it is determined that there is at least one candidate model available that is sufficient to satisfy the model request, processing may continue to operation 1006HH where it is determined whether there are a plurality of candidate models. If there is only one model, then in operation 1006II that model may be returned. Otherwise, processing may continue to operation 1006JJ where one of the candidate models is returned. In some embodiments, the most restrictive model may be returned.

It should be appreciated that the specific operations illustrated in FIG. 12 provide a particular process for determining a suitable thermodynamic model according to an embodiment. Other sequences of operations may also be performed according to alternative embodiments. For example, alternative embodiments of the present invention may perform the operations outlined above in a different order. Moreover, the individual operations illustrated in FIG. 12 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 13:
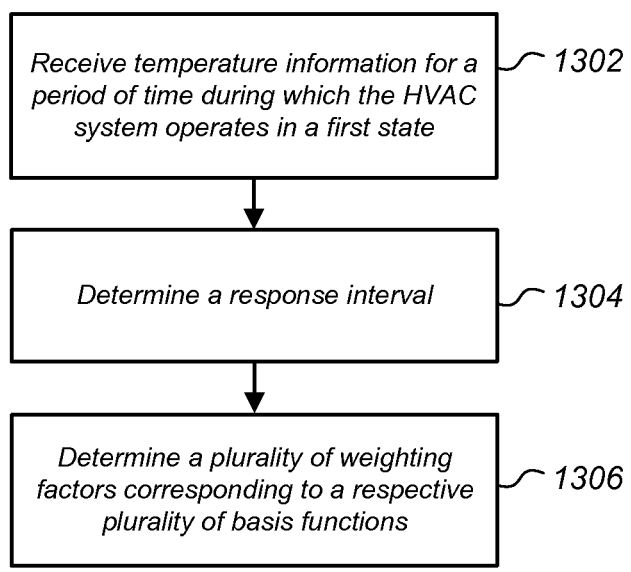
FIG. 13 illustrates a flowchart of a method of determining a thermodynamic model of an enclosure associated with an HVAC system, according to some embodiments.

FIG. 13 illustrates a flowchart of a method of determining a thermodynamic model of an enclosure associated with an HVAC system, according to some embodiments. The method may include receiving temperature information for a period of time during which the HVAC system operates in a first state (1302). In some embodiments, the temperature information may be received for a number of time periods during which the HVAC system operates in the first state, where those number of time periods represent a history of thermodynamic responses of the enclosure to actuation of the HVAC system. In some embodiments, the temperature information can define the temperature trajectory of the enclosure during the period(s) of time. From this history of temperature trajectories, future probabilistic trajectories in response to similar stimuli (i.e., HVAC actuations) may be determined.

The first state of the HVAC system may be any of the HVAC actuation states described herein, such as heating, cooling, first stage heating, second stage heating, fan activation, radiant flooring, dehumidification, humidification, and/or the like. The first HVAC state may also include times when the HVAC system is inactive and temperature within the enclosure is allowed to drift. The temperature information may comprise a vector of temperature values observed by a temperature sensor of the thermostat during the period(s) of time. The period(s) of time can comprise a learning period after installation of the thermostat. Alternatively or additionally, the learning period may comprise a previous interval during which the HVAC system operated in the first state. For example, the temperature information may include time-ordered vector temperature measurements observed when the HVAC system was previously actively heating/cooling the enclosure. In some embodiments and as mentioned, the temperature information can also include information for multiple previous time periods. This temperature information may be averaged together to generate an average temperature trajectory profile for the enclosure when the HVAC system is operating in the first state. In some cases, future temperature trajectory projections resulting from similar HVAC actuations may be determined by curve fitting to the previously measured temperature trajectories.

The method may also include determining a response interval (1304). In some embodiments, the response interval may represent an estimated time between when the HVAC system begins operating in the first state and when the temperature within the enclosure begins to change in a direction associated with the first state. For example, the response interval may indicate the estimated time between when the HVAC system begins heating the enclosure and when the temperature within the enclosure begins to rise in response to the heating function. For another example, the response interval may indicate the estimated time between when the HVAC system begins cooling the enclosure and when the temperature within the enclosure begins to decrease in response to the cooling function. In some embodiments, the response interval may be empirically determined based on previous HVAC cycles. The data used for the empirical determination can be specific to the particular enclosure, or may be generated by a central thermostat management system and based on data from a plurality of thermostats in similar enclosures. The response interval may be specific to each HVAC operating state. For example, the first operating state may be associated with a first response interval, while a second HVAC state (where, e.g., the HVAC system has actuated both a heating stage and a fan stage) is associated with a second response interval that is different from the first response interval (e.g., the enclosure may respond faster to air conditioning than it does to heating).

The method may additionally include determining a plurality of weighting factors corresponding to a respective plurality of predetermined basis functions (1306). Depending on the particular embodiment, any of the basis functions described herein may be used to form a thermodynamic model for each individual HVAC actuation state. By selecting one or more basis functions, the weighted combination of basis functions can characterize the temperature trajectory of the enclosure in response to the HVAC system operating in any particular state. The model fitting operations described above can be used to determine the weights for each of the basis functions.

In some embodiments, at least two types of basis functions may be used to form the thermodynamic model. A first basis function can represent the effect of a previous HVAC cycle on the current HVAC cycle. A second basis function can represent the effect of the current HVAC function on the current HVAC cycle. As described in greater detail above, the first basis function can be evaluated from a time that the HVAC system begins operating in the first state until a time when the response interval ends. This may be referred to (as described above) as the early-state activity. Additionally, the second basis function can be evaluated beginning at the time when the response interval ends. Evaluation of the second basis function may continue until the end of the current HVAC cycle, or until the temperature differential between indoor and outdoor temperatures is such that the effectiveness of the HVAC system crosses a minimum threshold.

In some embodiments, other basis functions may be used in addition to or in the place of the two basis functions described above. Some embodiments may use a third basis function that represents the diurnal effect of sunlight on the enclosure. This third basis function can be evaluated during the response interval as well as after the response interval. A fourth basis function may represent the temperature differential between indoor and outdoor temperatures, and may be part of a thermodynamic model when the HVAC system is in a drift state.

Figure 14:
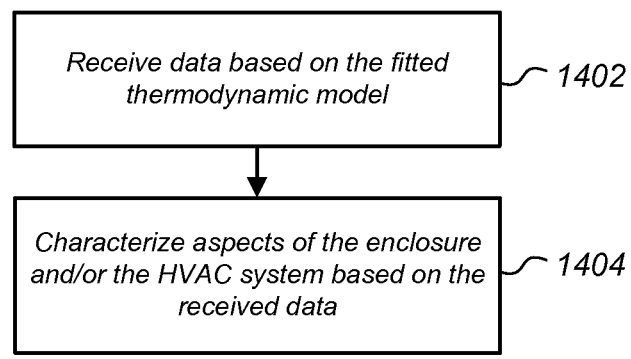
FIG. 14 illustrates a flowchart of a method for characterizing the enclosure and/or the HVAC system based on the thermodynamic model.

FIG. 14 illustrates a flowchart of a method for characterizing the enclosure and/or the HVAC system based on properties of the thermodynamic model. The method may include receiving data based on the fitted thermodynamic model (1402). This data may be received by a local processing unit on a smart home control device, such as a thermostat or a local computer system. This data may also be received by a central monitoring system, such as a thermostat management server that collects data from a number of different smart home devices in different enclosures. This data may be transmitted through a local private network, such as a home Wi-Fi network, through a router connected to a public network such as the Internet, and received remotely by the central monitoring system. In some embodiments, the data from the fitted thermodynamic model may comprise the calculated weights for each of a plurality of basis functions and/or an effectiveness factor determined for the enclosure as previously described.

In some embodiments, the data may include a history of the calculated weights, and/or an indication of changes to the weights over time. The absolute value of the weights may be indicative of enclosure and/or HVAC system characteristics of interest, such as whether an HVAC system is particularly inefficient (compared to a standard benchmark of HVAC system effectiveness, compared to other HVAC systems and corresponding enclosures within a community/geographical region/etc., or compared to other suitable reference points). It should be recognized that while the 'effectiveness factor' described herein is described as a factor indicative of an HVAC system's ability to satisfy setpoint temperatures given a difference in outdoor and indoor temperature, the effectiveness factor may also be tied to an HVAC cycle time. More specifically, in HVAC systems that have a low 'effectiveness', the time required for the HVAC system to reconcile a given difference in setpoint temperature and indoor temperature may vary significantly over a range of outdoor temperatures. For example, while in a heating mode and being controlled to heat an enclosure from a current° C. to a setpoint° C., the HVAC system having a low 'effectiveness' may require 5 minutes to perform the required heating when the outdoor temperature is relatively warm but may require 50 minutes to perform the required heating when the outdoor temperature is relatively cold. Or, in an extreme case, may never be capable of driving the enclosure to the setpoint° C. when the outdoor temperature is relatively cold. In contrast, in HVAC systems that have a high 'effectiveness', the time required for the HVAC system to reconcile a given difference in setpoint temperature and indoor temperature may vary only slightly over a range of outdoor temperatures. For example, while in a heating mode and being controlled to heat an enclosure from current° C. to setpoint° C., the HVAC system having a high 'effectiveness' may require 5 minutes to perform the required heating when the outdoor temperature is relatively and only 10 minutes to perform the required heating when the outdoor temperature is relatively cold. In this context, an 'effective' HVAC system may exhibit a low variation in duty cycle across various differences in setpoint temperatures and indoor temperatures regardless of an outdoor temperature, and an 'ineffective' HVCA system may exhibit a high variation in duty cycle across various differences in setpoint temperatures and indoor temperatures regardless of an outdoor temperature. Notably, an 'overly effective' (i.e., too much capacity for a given enclosure) may exhibit zero variation in duty cycle across various differences in setpoint temperatures and indoor temperatures regardless of an outdoor temperature.

In some embodiments, the acquisition and comparison of effectiveness benchmarks with particular HVAC system efficiencies may be performed by a particular thermostat or, in some cases, performed by a remote server such as the central server or cloud-computing system 164. Similarly, changes to the weights and/or effectiveness factor for a given enclosure over time may be indicative of changes to characteristics of interest of the enclosure and/or associated HVAC system. For example, an effectiveness factor that depreciates over time may be indicative of wear and tear of the HVAC system itself (e.g., air filters) or other properties of the enclosure (e.g., window sealants). Such changes may be recorded and monitored by any suitable device, such as a particular thermostat used to environmentally condition the enclosure or a remote server such as the central server or cloud-computing system 164.

The method may also include characterizing aspects of the enclosure and/or the HVAC system based on the received data (1404). Generally, and as previously introduced, the received data can be used to characterize many different aspects of the enclosure and/or HVAC system. More specifically, in some embodiments, data can be used to determine the effectiveness or strength of an HVAC system. For example, a large value for $w_2$ in equation (6) above may indicate a more powerful or more efficient HVAC system, while a relatively small value for $w_2$ may indicate an underpowered or inefficient HVAC system. This can be used to diagnose whether an HVAC system is operating in an efficient manner, or whether the HVAC system is properly sized for the enclosure. Similarly, an effectiveness factor as defined in, e.g., equation (5) may indicate whether a particular HVAC system is efficient, where a large value for $\sigma$ may indicate an efficient HVAC system and a small value for $\sigma$ may indicate an inefficient HVAC system. In another example, a large value for $w_3$ and/or $w_4$ may indicate that the enclosure is insufficiently insulated as heat rapidly moves into or out of the enclosure during HVAC drift cycles. In addition to the basis function weights, other values can also be used to diagnose a characteristic of the enclosure and/or HVAC system. For example, a large response time may indicate that the enclosure has overly long HVAC ducts, or that the HVAC system is in a particularly hot/cold part of the enclosure.

In some embodiments, the data based on the fitted thermodynamic model for a single enclosure may be compared to other enclosures by a central thermostat monitoring system. For example, basis function weights, response times, and/or temperature trajectory profiles may be compared to other similar enclosures. Determinations can be made based on these comparisons about how a particular HVAC system is performing relative to its peers. Similarly, determinations can be made based on these comparisons about how a particular enclosure responds to its HVAC systems relative to its peers.

In some embodiments, any characterizations made about the HVAC system and/or the enclosure can be relayed to a customer or other party of interest, such as a sales/service company. For example, a thermostat can display an indication on a user interface describing problems that may be of interest to a customer, such as "your air conditioner seems too small for your home," or "your home seems to heat less quickly than before—have you checked your air filter recently?" Some embodiments may also offer services that can remedy these problems, such as insulation installation service, air-conditioner replacement service, and/or the like. These embodiments may even automate contact between the customer and the service provider to initiate a new installation, upgrade/service the HVAC system, etc. Some embodiments may also provide these indications to the customer or other party of interest via e-mail, through a notification in their online thermostat management account, or through any other means of modern communication.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Further, embodiments may include some or all of the systems, methods, apparatus, etc. described in one or more of the following commonly assigned applications, each of which is incorporated by reference herein in its entirety for all purposes: U.S. Ser. No. 13/842,213, supra; U.S. Ser. No. 13/632,118 (Ref. No. NES0119-US) filed Sep. 30, 2012; U.S. Ser. No. 13/632,093 (Ref. No. NES0122-US) filed Sep. 30, 2012; U.S. Ser. No. 13/632,028, supra; U.S. Ser. No. 13/632,041 (Ref. No. NES0162-US) filed Sep. 30, 2012; U.S. Ser. No. 13/632,070 (Ref. No. NES0234-US) filed Sep. 30, 2012; U.S. Prov. Ser. No. 61/704,437, supra (Ref. No. NES0254-US); PCT Application No. PCT/US12/20026 (Ref. No. NES0185-PCT) filed Jan. 3, 2012; PCT Application No. PCT/US12/00007 (Ref. No. NES0190-PCT), filed Jan. 3, 2012; and U.S. Ser. No. 13/269,501 (Ref. No. NES0120-US) filed Oct. 7, 2011; U.S. Ser. No. 13/866,602 (Ref. No. NES0339-US) filed Apr. 19, 2013; U.S. Ser. No. 13/866,578 (Ref. No. NES0211-US) filed Apr. 19, 2013; U.S. Ser. No. 13/842,213 (Ref. No. NES0253-US) filed Mar. 15, 2013; U.S. Ser. No. 13/842,048 (Ref. No. NES0326-US) filed Mar. 15, 2013; U.S. Ser. No. 13/828,767 (Ref. No. NES0327-US) filed Mar. 14, 2013; U.S. Ser. No. 13/871,748 (Ref. No. NES0331-US) filed Apr. 26, 2013; and U.S. Ser. No. 13/866,635 (Ref. No. NES0340-US) filed Apr. 19, 2013.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings. Various methods, apparatus, systems, and computer-readable mediums are described herein that concern the field of thermodynamic behavioral modeling of structures. In many modern systems, including systems such include HVAC systems which manage the environmental characteristics in a structure, it is desirable to predict the thermodynamic behavior of a structure. Such predictions may have a variety of tangible, beneficial uses. In modern HVAC control systems, such predictions may be used on a daily basis to accurately actuate the HVAC system in reaching or maintaining desired setpoint temperatures. Such predictions may also be used periodically, such as during demand-response (DR) events, to more accurately identify a schedule of setpoint temperatures that maximizes the amount of energy shifted from the DR event period to a period of time outside of the DR event period, or a schedule that is optimal in some additional or alternative sense.

Regardless of the specific application in which predictions of thermodynamic behavior are implemented, such predictions in many embodiments are facilitated by the use of a thermodynamic model of the structure. The thermodynamic model itself may be defined by one or more basis functions that characterize a trajectory of an environmental condition associated with the structure, such as indoor temperature, in response to application of a stimulus, such as a change in HVAC actuation state. In generating the model, weighting factors for each of the basis functions may be fit to a history of data indicative of past environmental condition trajectories that resulted from past changes in HVAC actuation states. Once the model has been generated, it may subsequently be used to simulate the thermodynamic behavior of the structure.

It should be recognized that the term "thermodynamic" may include all state variables that can be used to characterize a physical system. Examples of thermodynamic variables include, but are not limited to: pressure, temperature, airflow, humidity, and particulate matter. Further, the term "model" refers generally to a description or representation of a system. The description or representation can use mathematical language, such as in the case of mathematical models. Examples of types of models and/or characteristics of models, without limitation, include: lookup tables, linear, non-linear, deterministic, probabilistic, static, dynamic, and models having lumped parameters and/or distributed parameters.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method of determining a thermodynamic model of an enclosure associated with a heating, ventilation, and air conditioning (HVAC) system, the method comprising:
    receiving temperature information for a period of time during which the HVAC system operates in a first state, the temperature information defining a temperature trajectory of the enclosure during the period of time;
    determining, by a computer system, a response interval that indicates an estimated time between when the HVAC system begins operating in the first state and when the temperature within the enclosure begins to change in a direction associated with the first state;
    determining, by the computer system and using the temperature information, a plurality of weighting factors corresponding to a respective plurality of basis functions, the weighted combination of basis functions forming the thermodynamic model and characterizing the temperature trajectory of the enclosure in response to the HVAC system operating in the first state, wherein the plurality of basis functions comprises:
        a first basis function that is evaluated from a time that the HVAC system begins operating in the first state until a time when the response interval ends, wherein the first basis function represents an effect of a previous HVAC cycle on a current HVAC cycle; and
        a second basis function that is evaluated beginning at the time when the response interval ends until the HVAC stops operating in the first state, wherein the second basis function represents an effect of the HVAC system operating in the first state during a current HVAC cycle and includes an effectiveness factor that represents an effectiveness of the HVAC system with respect to differences in a temperature outside of the enclosure and a temperature inside of the enclosure; and
    causing, by the computer system, the HVAC system to operate in the first state using the thermodynamic model of the enclosure in response to the HVAC system operating in the first state.

2. The method of claim 1, wherein the response interval is empirically determined based on previous HVAC cycles of the HVAC system operating in the first state.

3. The method of claim 1, wherein the response interval is empirically determined based on data received from other enclosures.

4. The method of claim 1, wherein the plurality of basis functions further comprises a third basis function that represents an effect of sunlight on the enclosure.

5. The method of claim 4, wherein the third basis function is evaluated during the response interval and after the response interval ends.

6. The method of claim 4, wherein:
the first state comprises a drift state wherein the HVAC system does not actively heat or cool the enclosure; and
the plurality of basis functions further comprises a fourth basis function that represents an effect of a temperature differential between an outdoor temperature and an indoor temperature.

7. A thermostat for controlling operations of an HVAC system in an enclosure, the thermostat comprising:
HVAC control circuitry operable to actuate one or more elements of the HVAC system;
one or more sensors for measuring environmental characteristics associated with the enclosure; and
one or more processors coupled to the HVAC control circuitry and the one or more sensors, the one or more processors operable to cause the thermostat to perform operations including:
receiving, via the one or more sensors, temperature information for a period of time during which the HVAC system operates in a first state, the temperature information defining a temperature trajectory of the enclosure during the period of time;
determining a response interval that indicates an estimated time between when the HVAC system begins operating in the first state and when the temperature within the enclosure begins to change in a direction associated with the first state;
determining, using the temperature information, a plurality of weighting factors corresponding to a respective plurality of basis functions, the weighted combination of basis functions forming the thermodynamic model and characterizing the temperature trajectory of the enclosure in response to the HVAC system operating in the first state, wherein the plurality of basis functions comprises:
a first basis function that is evaluated from a time that the HVAC system begins operating in the first state until a time when the response interval ends, wherein the first basis function represents an effect of a previous HVAC cycle on a current HVAC cycle; and
a second basis function that is evaluated beginning at the time when the response interval ends until the HVAC stops operating in the first state, wherein the second basis function represents an effect of the HVAC system operating in the first state during a current HVAC cycle and includes an effectiveness factor that represents an effectiveness of the HVAC system with respect to differences in a temperature outside of the enclosure and a temperature inside of the enclosure; and
causing, by the computer system, the HVAC system to operate in the first state using the thermodynamic model of the enclosure in response to the HVAC system operating in the first state.

8. The thermostat of claim 7, further comprising wireless communication circuitry that sends one or more of the plurality of weighting factors and/or an HVAC effectiveness factor to a thermostat management server.

9. The thermostat of claim 8, wherein the wireless communication circuitry further sends a length of the response interval to the thermostat management server.

10. The thermostat of claim 7, wherein the one or more processors are further operable to cause the thermostat to perform operations including characterizing an aspect of the HVAC system based on one or more of the plurality of weighting factors and/or an HVAC effectiveness factor.

11. The thermostat of claim 10, further comprising a user interface that provides an indication associated with the aspect of the HVAC system characterized by the one or more processors.

12. The thermostat of claim 7, wherein the plurality of weighting factors are determined using a local time-of-day and information provided by the one or more sensors.

13. A tangible, non-transitory, computer-readable storage medium including instructions that, when executed by one or more processors, cause the one or more processors to perform operations including:
receiving temperature information for a period of time during which the HVAC system operates in a first state, the temperature information defining a temperature trajectory of the enclosure during the period of time;
determining a response interval that indicates an estimated time between when the HVAC system begins operating in the first state and when the temperature within the enclosure begins to change in a direction associated with the first state;
determining, using the temperature information, a plurality of weighting factors corresponding to a respective plurality of basis functions, the weighted combination of basis functions forming the thermodynamic model and characterizing the temperature trajectory of the enclosure in response to the HVAC system operating in the first state, wherein the plurality of basis functions comprises:
a first basis function that is evaluated from a time that the HVAC system begins operating in the first state until a time when the response interval ends, wherein the first basis function represents an effect of a previous HVAC cycle on a current HVAC cycle; and
a second basis function that is evaluated beginning at the time when the response interval ends until the HVAC stops operating in the first state, wherein the second basis function represents an effect of the HVAC system operating in the first state during a current HVAC cycle and includes an effectiveness factor that represents an effectiveness of the HVAC system with respect to differences in a temperature outside of the enclosure and a temperature inside of the enclosure; and
causing, by the computer system, the HVAC system to operate in the first state using the thermodynamic model of the enclosure in response to the HVAC system operating in the first state.

14. The storage medium of claim 13, wherein each of the plurality of basis functions characterizes at least a portion of the temperature trajectory.

15. The storage medium of claim 13, wherein the effectiveness factor is higher for small differences in outside and inside temperature and lower for large differences in outside and inside temperature.

16. The storage medium of claim 13, wherein the effectiveness factor is determined empirically based on previous HVAC cycles.

17. The storage medium of claim 13, wherein the operations further include:
- identifying a demand-response event period;
- predicting a thermodynamic behavior of the enclosure during at least a portion of the demand-response event period based on the weighting factors and the basis functions; and
- controlling the HVAC system during the demand-response event period based at least in part on the predicted thermodynamic behavior of the enclosure.

* * * * *